(12) United States Patent
Agarwal et al.

(10) Patent No.: US 10,348,625 B2
(45) Date of Patent: *Jul. 9, 2019

(54) SHARING COMMON L2 SEGMENT IN A VIRTUAL DISTRIBUTED ROUTER ENVIRONMENT

(71) Applicant: Nicira, Inc., Palo Alto, CA (US)

(72) Inventors: Vivek Agarwal, Campbell, CA (US); Ganesan Chandrashekhar, Campbell, CA (US); Rahul Korivi Subramaniyam, Sunnyvale, CA (US); Howard Wang, Cupertino, CA (US); Ram Dular Singh, Cupertino, CA (US)

(73) Assignee: NICIRA, INC., Palo Alto, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 14/840,277

(22) Filed: Aug. 31, 2015

(65) Prior Publication Data

US 2017/0005918 A1    Jan. 5, 2017

Related U.S. Application Data

(60) Provisional application No. 62/186,623, filed on Jun. 30, 2015.

(51) Int. Cl.
*H04L 12/24* (2006.01)
*H04L 12/741* (2013.01)
(Continued)

(52) U.S. Cl.
CPC .......... *H04L 45/74* (2013.01); *G06F 9/45558* (2013.01); *H04L 12/4641* (2013.01); *H04L 41/0893* (2013.01); *H04L 45/04* (2013.01); *H04L 45/38* (2013.01); *H04L 45/44* (2013.01); *H04L 45/586* (2013.01); *H04L 45/66* (2013.01);
(Continued)

(58) Field of Classification Search
None
See application file for complete search history.

(56) References Cited

U.S. PATENT DOCUMENTS 5,504,921 A    4/1996  Dev et al.
5,550,816 A    8/1996  Hardwick et al.
(Continued)

FOREIGN PATENT DOCUMENTS

CN    102571998 A    7/2012
EP     1653688 A1    5/2006
(Continued)

OTHER PUBLICATIONS

US 5,006,275 A, 12/1999, Picazo et al. (withdrawn)
(Continued)

*Primary Examiner* — Willie J Daniel, Jr.
(74) *Attorney, Agent, or Firm* — Adeli LLP

(57) ABSTRACT

A LRE (logical routing element) that have LIFs that are active in all host machines spanned by the LRE as well as LIFs that are active in only a subset of those spanned host machines is provided. A host machine having an active LIF for a particular L2 segment would perform the L3 routing operations for network traffic related to that L2 segment. A host machine having an inactive LIF for the particular L2 segment would not perform L3 routing operations for the network traffic of the L2 segment.

24 Claims, 19 Drawing Sheets

(51) Int. Cl.
*G06F 9/455* (2018.01)
*H04L 12/721* (2013.01)
*H04L 12/713* (2013.01)
*H04L 12/801* (2013.01)
*H04L 29/08* (2006.01)
*H04L 12/46* (2006.01)
*H04L 12/715* (2013.01)
*H04L 12/931* (2013.01)

(52) U.S. Cl.
CPC ............ *H04L 47/33* (2013.01); *H04L 69/325* (2013.01); *G06F 2009/45595* (2013.01); *H04L 49/70* (2013.01)

(56) References Cited

U.S. PATENT DOCUMENTS

| | | |
|---|---|---|
| 5,751,967 A | 5/1998 | Raab et al. |
| 6,104,699 A | 8/2000 | Holender et al. |
| 6,219,699 B1 | 4/2001 | McCloghrie et al. |
| 6,359,909 B1 | 3/2002 | Ito et al. |
| 6,456,624 B1 | 9/2002 | Eccles et al. |
| 6,493,767 B1 | 12/2002 | Ishida et al. |
| 6,512,745 B1 | 1/2003 | Abe et al. |
| 6,539,432 B1 | 3/2003 | Taguchi et al. |
| 6,631,137 B1 | 10/2003 | Lorrain et al. |
| 6,640,251 B1 | 10/2003 | Wiget et al. |
| 6,680,934 B1 | 1/2004 | Cain |
| 6,785,843 B1 | 8/2004 | McRae et al. |
| 6,941,487 B1 | 9/2005 | Balakrishnan et al. |
| 6,950,428 B1 | 9/2005 | Horst et al. |
| 6,963,585 B1 | 11/2005 | Pennec et al. |
| 6,999,454 B1 | 2/2006 | Crump |
| 7,046,630 B2 | 5/2006 | Abe et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,215,637 B1 | 5/2007 | Ferguson et al. |
| 7,260,648 B2 | 8/2007 | Tingley et al. |
| 7,283,473 B2 | 10/2007 | Arndt et al. |
| 7,339,929 B2 | 3/2008 | Zelig et al. |
| 7,342,916 B2 | 3/2008 | Das et al. |
| 7,391,771 B2 | 6/2008 | Orava et al. |
| 7,450,598 B2 | 11/2008 | Chen et al. |
| 7,463,579 B2 | 12/2008 | Lapuh et al. |
| 7,478,173 B1 | 1/2009 | Delco |
| 7,555,002 B2 | 6/2009 | Arndt et al. |
| 7,606,260 B2 | 10/2009 | Oguchi et al. |
| 7,643,488 B2 | 1/2010 | Khanna et al. |
| 7,649,851 B2 | 1/2010 | Takashige et al. |
| 7,710,874 B2 | 5/2010 | Balakrishnan et al. |
| 7,760,735 B1 | 7/2010 | Chen et al. |
| 7,764,599 B2 | 7/2010 | Doi et al. |
| 7,792,987 B1 | 9/2010 | Vohra et al. |
| 7,802,000 B1 | 9/2010 | Huang et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,190,767 B1 | 5/2012 | Maufer et al. |
| 8,194,674 B1 | 6/2012 | Pagel et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,239,572 B1 | 8/2012 | Brandwine et al. |
| 8,265,075 B2 | 9/2012 | Pandey |
| 8,281,067 B2 | 10/2012 | Stolowitz |
| 8,312,129 B1 | 11/2012 | Miller et al. |
| 8,320,388 B2 | 11/2012 | Louati et al. |
| 8,339,959 B1 | 12/2012 | Moisand et al. |
| 8,339,994 B2 | 12/2012 | Gnanasekaran et al. |
| 8,351,418 B2 | 1/2013 | Zhao et al. |
| 8,370,834 B2 | 2/2013 | Edwards et al. |
| 8,401,024 B2 | 3/2013 | Christensen et al. |
| 8,456,984 B2 | 6/2013 | Ranganathan et al. |
| 8,504,718 B2 | 8/2013 | Wang et al. |
| 8,565,108 B1 | 10/2013 | Marshall et al. |
| 8,611,351 B2 | 12/2013 | Gooch et al. |
| 8,611,352 B2 | 12/2013 | Mizrahi et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,627,313 B2 | 1/2014 | Edwards et al. |
| 8,644,188 B1 | 2/2014 | Brandwine et al. |
| 8,660,129 B1 | 2/2014 | Brendel et al. |
| 8,837,281 B2 | 9/2014 | Sultan et al. |
| 8,848,508 B2 | 9/2014 | Moreno et al. |
| 8,856,518 B2 | 10/2014 | Sridharan et al. |
| 8,923,155 B2 | 12/2014 | Qu et al. |
| 8,958,298 B2 | 2/2015 | Zhang et al. |
| 8,989,183 B2 | 3/2015 | Bansal et al. |
| 9,008,097 B2 | 4/2015 | Bloach et al. |
| 9,059,999 B2 | 6/2015 | Koponen et al. |
| 9,137,052 B2 | 9/2015 | Koponen et al. |
| 9,225,636 B2 | 12/2015 | Krishnan et al. |
| 9,246,821 B1 | 1/2016 | Li et al. |
| 9,306,837 B1 | 4/2016 | Jain et al. |
| 9,407,450 B2 | 8/2016 | Singh |
| 9,413,644 B2 | 8/2016 | Agarwal et al. |
| 9,448,821 B2 | 9/2016 | Wang |
| 9,575,782 B2 | 2/2017 | Chandrashekhar et al. |
| 9,768,980 B2 | 9/2017 | Subramaniyam et al. |
| 9,785,455 B2 | 10/2017 | Chandrashekhar et al. |
| 9,893,988 B2 | 2/2018 | Agarwal et al. |
| 9,910,686 B2 | 3/2018 | Chandrashekhar et al. |
| 9,977,685 B2 | 5/2018 | Chandrashekhar et al. |
| 10,020,960 B2 | 7/2018 | Wang et al. |
| 2001/0043614 A1 | 11/2001 | Viswanadham et al. |
| 2002/0013858 A1 | 1/2002 | Anderson |
| 2002/0093952 A1 | 7/2002 | Gonda |
| 2002/0194369 A1 | 12/2002 | Rawlins et al. |
| 2003/0026258 A1 | 2/2003 | Takatani et al. |
| 2003/0026271 A1 | 2/2003 | Erb et al. |
| 2003/0041170 A1 | 2/2003 | Suzuki |
| 2003/0058850 A1 | 3/2003 | Rangarajan et al. |
| 2003/0069972 A1 | 4/2003 | Yoshimura et al. |
| 2003/0093481 A1 | 5/2003 | Mitchell et al. |
| 2004/0054799 A1 | 3/2004 | Meier et al. |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2005/0018669 A1 | 1/2005 | Arndt et al. |
| 2005/0025179 A1 | 2/2005 | McLaggan et al. |
| 2005/0027881 A1 | 2/2005 | Figueira et al. |
| 2005/0053079 A1 | 3/2005 | Havala |
| 2005/0083953 A1 | 4/2005 | May |
| 2005/0120160 A1 | 6/2005 | Plouffe et al. |
| 2005/0132044 A1 | 6/2005 | Guingo et al. |
| 2005/0182853 A1 | 8/2005 | Lewites et al. |
| 2006/0002370 A1 | 1/2006 | Rabie et al. |
| 2006/0026225 A1 | 2/2006 | Canali et al. |
| 2006/0029056 A1 | 2/2006 | Perera et al. |
| 2006/0056412 A1 | 3/2006 | Page |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |

(56) References Cited

U.S. PATENT DOCUMENTS

| | | |
|---|---|---|
| 2006/0187908 A1 | 8/2006 | Shimozono et al. |
| 2006/0193266 A1 | 8/2006 | Siddha et al. |
| 2006/0291388 A1 | 12/2006 | Amdahl et al. |
| 2007/0008981 A1 | 1/2007 | Pathan |
| 2007/0043860 A1 | 2/2007 | Pabari |
| 2007/0061492 A1 | 3/2007 | Riel |
| 2007/0064673 A1 | 3/2007 | Bhandaru et al. |
| 2007/0097948 A1 | 5/2007 | Boyd et al. |
| 2007/0140128 A1 | 6/2007 | Klinker et al. |
| 2007/0156919 A1 | 7/2007 | Potti et al. |
| 2007/0201357 A1 | 8/2007 | Smethurst et al. |
| 2007/0201490 A1 | 8/2007 | Mahamuni |
| 2007/0286209 A1 | 12/2007 | Wang et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0008148 A1 | 1/2008 | Sagawa |
| 2008/0013474 A1 | 1/2008 | Nagarajan et al. |
| 2008/0049621 A1 | 2/2008 | McGuire et al. |
| 2008/0049646 A1 | 2/2008 | Lu |
| 2008/0059556 A1 | 3/2008 | Greenspan et al. |
| 2008/0069107 A1 | 3/2008 | Sofia et al. |
| 2008/0071900 A1 | 3/2008 | Hecker et al. |
| 2008/0072305 A1 | 3/2008 | Casado et al. |
| 2008/0086726 A1 | 4/2008 | Griffith et al. |
| 2008/0151893 A1 | 6/2008 | Nordmark et al. |
| 2008/0159301 A1 | 7/2008 | Heer |
| 2008/0181243 A1 | 7/2008 | Vobbilisetty et al. |
| 2008/0189769 A1 | 8/2008 | Casado et al. |
| 2008/0225853 A1 | 9/2008 | Melman et al. |
| 2008/0240122 A1 | 10/2008 | Richardson et al. |
| 2008/0253366 A1 | 10/2008 | Zuk et al. |
| 2008/0291910 A1 | 11/2008 | Tadimeti et al. |
| 2008/0298274 A1 | 12/2008 | Takashige et al. |
| 2009/0031041 A1 | 1/2009 | Clemmensen |
| 2009/0043823 A1 | 2/2009 | Iftode et al. |
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0129271 A1 | 5/2009 | Ramankutty et al. |
| 2009/0150521 A1 | 6/2009 | Tripathi |
| 2009/0150527 A1 | 6/2009 | Tripathi et al. |
| 2009/0161547 A1 | 6/2009 | Riddle et al. |
| 2009/0235325 A1 | 9/2009 | Dimitrakos et al. |
| 2009/0249470 A1 | 10/2009 | Litvin et al. |
| 2009/0249473 A1 | 10/2009 | Cohn |
| 2009/0279536 A1 | 11/2009 | Unbehagen et al. |
| 2009/0287848 A1 | 11/2009 | Kamura et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0046531 A1 | 2/2010 | Louati et al. |
| 2010/0107162 A1 | 4/2010 | Edwards et al. |
| 2010/0131636 A1 | 5/2010 | Suri et al. |
| 2010/0153554 A1 | 6/2010 | Anschutz et al. |
| 2010/0153701 A1 | 6/2010 | Shenoy et al. |
| 2010/0165877 A1 | 7/2010 | Shukla et al. |
| 2010/0169467 A1 | 7/2010 | Shukla et al. |
| 2010/0192225 A1 | 7/2010 | Ma et al. |
| 2010/0205479 A1 | 8/2010 | Akutsu et al. |
| 2010/0208615 A1 | 8/2010 | Soon et al. |
| 2010/0214949 A1 | 8/2010 | Smith et al. |
| 2010/0257263 A1 | 10/2010 | Casado et al. |
| 2010/0275199 A1 | 10/2010 | Smith et al. |
| 2010/0287548 A1 | 11/2010 | Zhou et al. |
| 2010/0290485 A1 | 11/2010 | Martini et al. |
| 2011/0016215 A1 | 1/2011 | Wang |
| 2011/0022695 A1 | 1/2011 | Dalai et al. |
| 2011/0032830 A1 | 2/2011 | Merwe et al. |
| 2011/0035494 A1 | 2/2011 | Pandey et al. |
| 2011/0075664 A1 | 3/2011 | Lambeth et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0103259 A1 | 5/2011 | Aybay et al. |
| 2011/0119748 A1 | 5/2011 | Edwards et al. |
| 2011/0134931 A1 | 6/2011 | Merwe et al. |
| 2011/0142053 A1 | 6/2011 | Merwe et al. |
| 2011/0194567 A1 | 8/2011 | Shen |
| 2011/0202920 A1 | 8/2011 | Takase |
| 2011/0205931 A1 | 8/2011 | Zhou et al. |
| 2011/0225207 A1 | 9/2011 | Subramanian et al. |
| 2011/0261825 A1 | 10/2011 | Ichino |
| 2011/0264610 A1 | 10/2011 | Armstrong et al. |
| 2011/0283017 A1 | 11/2011 | Alkhatib et al. |
| 2011/0299534 A1 | 12/2011 | Koganti et al. |
| 2011/0299537 A1 | 12/2011 | Saraiya et al. |
| 2011/0310899 A1 | 12/2011 | Alkhatib et al. |
| 2011/0317703 A1 | 12/2011 | Dunbar et al. |
| 2011/0320577 A1 | 12/2011 | Bhat et al. |
| 2012/0008528 A1 | 1/2012 | Dunbar et al. |
| 2012/0014386 A1 | 1/2012 | Xiong et al. |
| 2012/0014387 A1 | 1/2012 | Dunbar et al. |
| 2012/0017022 A1 | 1/2012 | Corrigan et al. |
| 2012/0131643 A1 | 5/2012 | Cheriton |
| 2012/0158997 A1 | 6/2012 | Hsu et al. |
| 2012/0182992 A1 | 7/2012 | Cowart et al. |
| 2012/0236734 A1 | 9/2012 | Sampath et al. |
| 2012/0307826 A1 | 12/2012 | Matsuoka |
| 2012/0323987 A1 | 12/2012 | Cantu et al. |
| 2013/0007740 A1 | 1/2013 | Kikuchi et al. |
| 2013/0010600 A1 | 1/2013 | Jocha et al. |
| 2013/0016723 A1 | 1/2013 | Arad et al. |
| 2013/0031233 A1 | 1/2013 | Feng et al. |
| 2013/0034094 A1 | 2/2013 | Cardona et al. |
| 2013/0044629 A1 | 2/2013 | Biswas et al. |
| 2013/0044636 A1 | 2/2013 | Koponen et al. |
| 2013/0044641 A1 | 2/2013 | Koponen et al. |
| 2013/0054761 A1 | 2/2013 | Kempf et al. |
| 2013/0058346 A1 | 3/2013 | Sridharan et al. |
| 2013/0073743 A1 | 3/2013 | Ramasamy et al. |
| 2013/0097345 A1 | 4/2013 | Munoz et al. |
| 2013/0103817 A1 | 4/2013 | Koponen et al. |
| 2013/0124750 A1 | 5/2013 | Anumala et al. |
| 2013/0125112 A1 | 5/2013 | Mittal et al. |
| 2013/0136126 A1 | 5/2013 | Wang et al. |
| 2013/0142048 A1 | 6/2013 | Gross et al. |
| 2013/0145002 A1 | 6/2013 | Kannan et al. |
| 2013/0145008 A1 | 6/2013 | Kannan et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0151685 A1 | 6/2013 | Bursell |
| 2013/0227550 A1 | 8/2013 | Weinstein et al. |
| 2013/0227566 A1 | 8/2013 | Higuchi et al. |
| 2013/0266015 A1 | 10/2013 | Qu et al. |
| 2013/0266019 A1 | 10/2013 | Qu et al. |
| 2013/0268588 A1 | 10/2013 | Chang et al. |
| 2013/0301553 A1 | 11/2013 | Klein |
| 2013/0318219 A1 | 11/2013 | Kancherla |
| 2013/0322453 A1 | 12/2013 | Allan |
| 2013/0329548 A1 | 12/2013 | Nakil et al. |
| 2013/0332602 A1 | 12/2013 | Nakil et al. |
| 2013/0332619 A1 | 12/2013 | Xie et al. |
| 2013/0332983 A1 | 12/2013 | Koorevaar et al. |
| 2013/0339544 A1 | 12/2013 | Mithyantha et al. |
| 2014/0006585 A1 | 1/2014 | Dunbar et al. |
| 2014/0019639 A1 | 1/2014 | Ueno |
| 2014/0025779 A1 | 1/2014 | Matsumoto et al. |
| 2014/0036730 A1 | 2/2014 | Nellikar et al. |
| 2014/0036924 A1 | 2/2014 | Christenson |
| 2014/0050091 A1 | 2/2014 | Biswas et al. |
| 2014/0056298 A1 | 2/2014 | Vobbilisetty et al. |
| 2014/0064276 A1 | 3/2014 | Basso et al. |
| 2014/0068602 A1 | 3/2014 | Gember et al. |
| 2014/0092901 A1 | 4/2014 | Kapadia et al. |
| 2014/0092907 A1 | 4/2014 | Sridhar et al. |
| 2014/0112343 A1 | 4/2014 | Lambeth et al. |
| 2014/0115578 A1 | 4/2014 | Cooper et al. |
| 2014/0115584 A1 | 4/2014 | Mudigonda et al. |
| 2014/0123211 A1 | 5/2014 | Wanser et al. |

(56) References Cited

U.S. PATENT DOCUMENTS

| | | |
|---|---|---|
| 2014/0140244 A1 | 5/2014 | Kapadia et al. |
| 2014/0146817 A1 | 5/2014 | Zhang |
| 2014/0169169 A1 | 6/2014 | Almog et al. |
| 2014/0169215 A1 | 6/2014 | Rajendran et al. |
| 2014/0169222 A1 | 6/2014 | Cohen et al. |
| 2014/0195666 A1 | 7/2014 | Dumitriu et al. |
| 2014/0201733 A1 | 7/2014 | Benny et al. |
| 2014/0207930 A1 | 7/2014 | Benny |
| 2014/0233567 A1 | 8/2014 | Guo et al. |
| 2014/0269705 A1 | 9/2014 | DeCusatis et al. |
| 2014/0269709 A1 | 9/2014 | Benny et al. |
| 2014/0280738 A1 | 9/2014 | Kölker et al. |
| 2014/0282889 A1 | 9/2014 | Ishaya et al. |
| 2014/0294005 A1 | 10/2014 | Jain et al. |
| 2014/0328343 A1 | 11/2014 | Kapadia et al. |
| 2014/0334485 A1 | 11/2014 | Jain et al. |
| 2014/0337497 A1 | 11/2014 | Wanser et al. |
| 2014/0337500 A1 | 11/2014 | Lee |
| 2014/0348166 A1 | 11/2014 | Yang et al. |
| 2015/0010001 A1 | 1/2015 | Duda et al. |
| 2015/0043576 A1 | 2/2015 | Dixon et al. |
| 2015/0043581 A1 | 2/2015 | Devireddy et al. |
| 2015/0058470 A1 | 2/2015 | Duda |
| 2015/0058968 A1 | 2/2015 | Wang et al. |
| 2015/0063353 A1 | 3/2015 | Kapadia et al. |
| 2015/0100681 A1 | 4/2015 | Reese et al. |
| 2015/0103661 A1 | 4/2015 | Shen et al. |
| 2015/0103679 A1 | 4/2015 | Tessmer et al. |
| 2015/0103839 A1 | 4/2015 | Chandrashekhar et al. |
| 2015/0103842 A1 | 4/2015 | Chandrashekhar et al. |
| 2015/0103843 A1* | 4/2015 | Chandrashekhar ... H04L 45/741 370/409 |
| 2015/0106804 A1 | 4/2015 | Chandrashekhar et al. |
| 2015/0109923 A1 | 4/2015 | Hwang |
| 2015/0117454 A1 | 4/2015 | Koponen et al. |
| 2015/0124817 A1 | 5/2015 | Merchant et al. |
| 2015/0200954 A1 | 7/2015 | Gourlay et al. |
| 2015/0281042 A1 | 10/2015 | Agarwal et al. |
| 2015/0281048 A1 | 10/2015 | Agarwal et al. |
| 2015/0319009 A1 | 11/2015 | Zhao |
| 2015/0372943 A1 | 12/2015 | Hasan et al. |
| 2016/0021032 A1 | 1/2016 | Maier et al. |
| 2016/0057014 A1 | 2/2016 | Thakkar et al. |
| 2016/0094364 A1 | 3/2016 | Subramaniyam et al. |
| 2016/0094365 A1 | 3/2016 | Subramaniyam et al. |
| 2016/0094366 A1 | 3/2016 | Wang et al. |
| 2016/0094396 A1 | 3/2016 | Chandrashekhar et al. |
| 2016/0218925 A1 | 7/2016 | Mammen et al. |
| 2017/0005924 A1 | 1/2017 | Agarwal et al. |
| 2017/0005942 A1 | 1/2017 | Agarwal et al. |
| 2018/0167316 A1 | 6/2018 | Agarwal et al. |
| 2018/0276013 A1 | 9/2018 | Chandrashekhar et al. |

FOREIGN PATENT DOCUMENTS

| | | |
|---|---|---|
| EP | 2566129 A1 | 3/2013 |
| EP | 2648370 | 10/2013 |
| EP | 3318028 A1 | 5/2018 |
| JP | 2003069609 A | 3/2003 |
| JP | 2003124976 A | 4/2003 |
| JP | 2003318949 A | 11/2003 |
| JP | 2011171874 A | 9/2011 |
| JP | 2012231382 A | 11/2012 |
| JP | 2013-175075 | 9/2013 |
| JP | 2014-230217 | 12/2014 |
| KR | 1020070050864 A | 5/2007 |
| WO | 2005094008 A1 | 10/2005 |
| WO | 2005112390 A1 | 11/2005 |
| WO | 2008095010 A1 | 8/2008 |
| WO | 2012051884 A1 | 4/2012 |
| WO | 2012093429 A1 | 7/2012 |
| WO | WO 2013/063330 | 5/2013 |
| WO | WO 2013/074827 | 5/2013 |
| WO | 2013184846 A1 | 12/2013 |
| WO | 2015054671 A2 | 4/2015 |
| WO | 2015147942 A1 | 10/2015 |
| WO | 2016053372 A1 | 4/2016 |
| WO | 2016053640 A1 | 4/2016 |
| WO | PCT/US2016/039677 | 6/2016 |
| WO | 2017003957 A1 | 1/2017 |

OTHER PUBLICATIONS

U.S. Appl. No. 14/840,228, filed Aug. 31, 2015, Agarwal, Vivek, et al.

U.S. Appl. No. 14/840,309, filed Aug. 31, 2015, Agarwal, Vivek, et al.

Nygren, Anders, et al., "OpenFlow Switch Specification v.1.3.4 (Protocol version 0x04)," Mar. 27, 2014, 171 pages, Open Networking Foundation, Palo Alto, USA.

Watsen, Kent, "Conditional Enablement of Configuration Nodes," Feb. 2013, 8 pages, Internet Engineering Task Force Trust, Reston, USA.

PCT International Search Report and Written Opinion dated Oct. 17, 2016 for commonly owned International Patent Application PCT/US2016/039677, listed as item #69 in the 1449 filed Aug. 9, 2016.

Dumitriu, Dan Mihai, et al., (U.S. Appl. No. 61/514,990), filed Aug. 4, 2011.

Koponen, Teemu, et al., "Network Virtualization in Multi-tenant Datacenters," Technical Report TR-2013-001E, Aug. 2013, 22 pages, VMware, Inc., Palo Alto, CA, USA.

* cited by examiner

SHARING COMMON L2 SEGMENT IN A VIRTUAL DISTRIBUTED ROUTER ENVIRONMENT

CLAIM OF BENEFIT TO PRIOR APPLICATIONS

The present application claims the benefit of U.S. Provisional Patent Application 62/186,623, filed Jun. 30, 2015. U.S. Provisional Patent Applications 62/186,623 is incorporated herein by reference.

BACKGROUND

In a network virtualization environment, one of the more common applications deployed on hypervisors are 3-tier apps, in which a web-tier, a database-tier, and app-tier are on different L3 subnets. This requires IP (internet protocol) packets traversing from one virtual machine (VM) in one subnet to another VM in another subnet to first arrive at a L3 router, then forwarded to the destination VM using L2 MAC (media access control) address. This is true even if the destination VM is hosted on the same host machine as the originating VM. This generates unnecessary network traffic and causes higher latency and lower throughput, which significantly degrades the performance of the application running on the hypervisors. Generally speaking, this performance degradation occurs whenever any two VMs in two different network segments (e.g., different IP subnet, different L2 segments, or different overlay logical networks) communicate with each other.

U.S. patent application Ser. No. 14/137,862, filed on Dec. 20, 2013, describes a logical router element (LRE) that operates distributively across different host machines as a virtual distributed router (VDR). Each host machine operates its own local instance of the LRE as a managed physical routing element (MPRE) for performing L3 packet forwarding for the VMs running on that host. The LRE therefore makes it possible to forward data packets locally (i.e., at the originating hypervisor) without going through a shared L3 router.

SUMMARY

In some embodiments, a LRE (logical routing element) can have LIFs that are active in all host machines spanned by the LRE as well as LIFs that are active in only a subset of those spanned host machines. A LIF that is active in only a subset of host machines while remaining dormant in other host machines is referred to as an intermediate LIF, or iLIF in some embodiments. A host machine having an active LIF for a particular L2 segment would perform the L3 routing operations for network traffic related to that L2 segment. A host machine having an inactive LIF for the particular L2 segment would not perform L3 routing operations for the network traffic of the L2 segment.

A L2 segment can be an overlay network like VXLAN, or a VLAN IP subnet. In some embodiments, a LSE that correspond to a VXLAN is configured to be active on all host machines, and the LIF that correspond to the VXLAN is active on all host machines to perform the corresponding L3 routing tasks. In some embodiments, a VLAN segment is physically confined to a host machine or a subset of the host machines. In some embodiments, the LIF that corresponds to such a VLAN is active only on the subset of edge host machines. In order to perform L3 routing into a particular VNI that is active only on a subset of the host machine (i.e., a L2 segment whose LIF is an iLIF), some embodiments use a backplane conduit to send traffic from a host machine with an inactive LIF for the particular VNI to a host machine with an active LIF for the particular VNI. In some embodiments, a host machine with an active LIF is assigned a MAC address so it is uniquely identifiable in the backplane conduit as a destination. Such a MAC address is referred to as a "rMAC" (or "routing" MAC, or "re-route" MAC) in some embodiments.

In some embodiments, different tenants of a same datacenter (or multi-site environment) would share common resources, such as common edge services to an external network, or a common VLAN IP subnet provided by a network service provider. In some embodiments, the same VNI of the common resource is used by the multiple tenants that share the common resource, and the different tenants' corresponding LREs would have active LIFs for the same VNI at the same host machine. In some embodiments, active LIFs for different tenants have different rMACs, even when the LIFs have the same VNI. In some other embodiments, each tenant has its own backplane conduit such that the traffic to different tenants active LIFs are segregated by their respective conduits. In some embodiments, each tenant or LRE has its own backplane conduit such that different tenants can safely use the same rMAC address without blending backplane traffic.

In some embodiments, an iLIF can be active in multiple host machines. For each of such host machines, some embodiments assign a unique MAC. In other words, for a given iLIF, each of its active LIFs (or each of the host machines that operate an active LIF of the iLIF) is uniquely identifiable by such MACs. In some embodiment, such MACs are referred as lMACs (LIF MACs) as each lMAC is for identifying an active LIF. For some embodiments, lMAC and rMAC are both used for redirecting traffic for an iLIF from a host machine on which the iLIF is dormant to a host machine on which the iLIF is active.

In some embodiments, an lMAC is used to identify active LIFs when using iLIFs for routing. In some embodiments, lMAC is used as the destination MAC for the backplane conduit. Some embodiments use lMACs to segregate traffic between different tenants, even traffic for the L2 segment with the same VNI. Some embodiments use lMAC to select an IP interface from among several available IP interfaces for ECMP (equal cost multi-path) purposes.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

A virtual distributed router environment is one in which a logical router element (LRE) operates distributively across different host machines as a virtual distributed router (VDR). Each host machine operates its own local instance of the LRE as a managed physical routing element (MPRE) for performing L3 packet forwarding for the VMs running on that host. In addition to operating the distributed LRE, these different host machines also operate logical switching elements (LSEs) as distributed virtual switches (DVSs). Each host machine operates its own local instance of the LSE as a managed physical switching element (MPSE) for performing L2 packet switching for the VMs running on that host. The MPRE(s) and the MPSE of a host machine make it possible to forward data packets locally at the host machine without relying on physical L3 routers and/or physical L2 switches. Furthermore, the MPREs and MPSEs running on the different host machines operate according to the parameters/configurations that are set forth for their respective LREs and LSEs.

In some embodiments, each of these host machines is operating a virtualization software or a hypervisor that allows it to host one or more virtual machines (VMs) and to provide network access to those VMs. In some embodiments, the host machines running the LREs are in a network virtualization infrastructure over a physical network. Such a network virtualization infrastructure in some embodiments includes physical network nodes (such as external edge routers) that belong to a network segment that is served by one of the LREs and yet do not operate the LRE itself.

Figure 1:
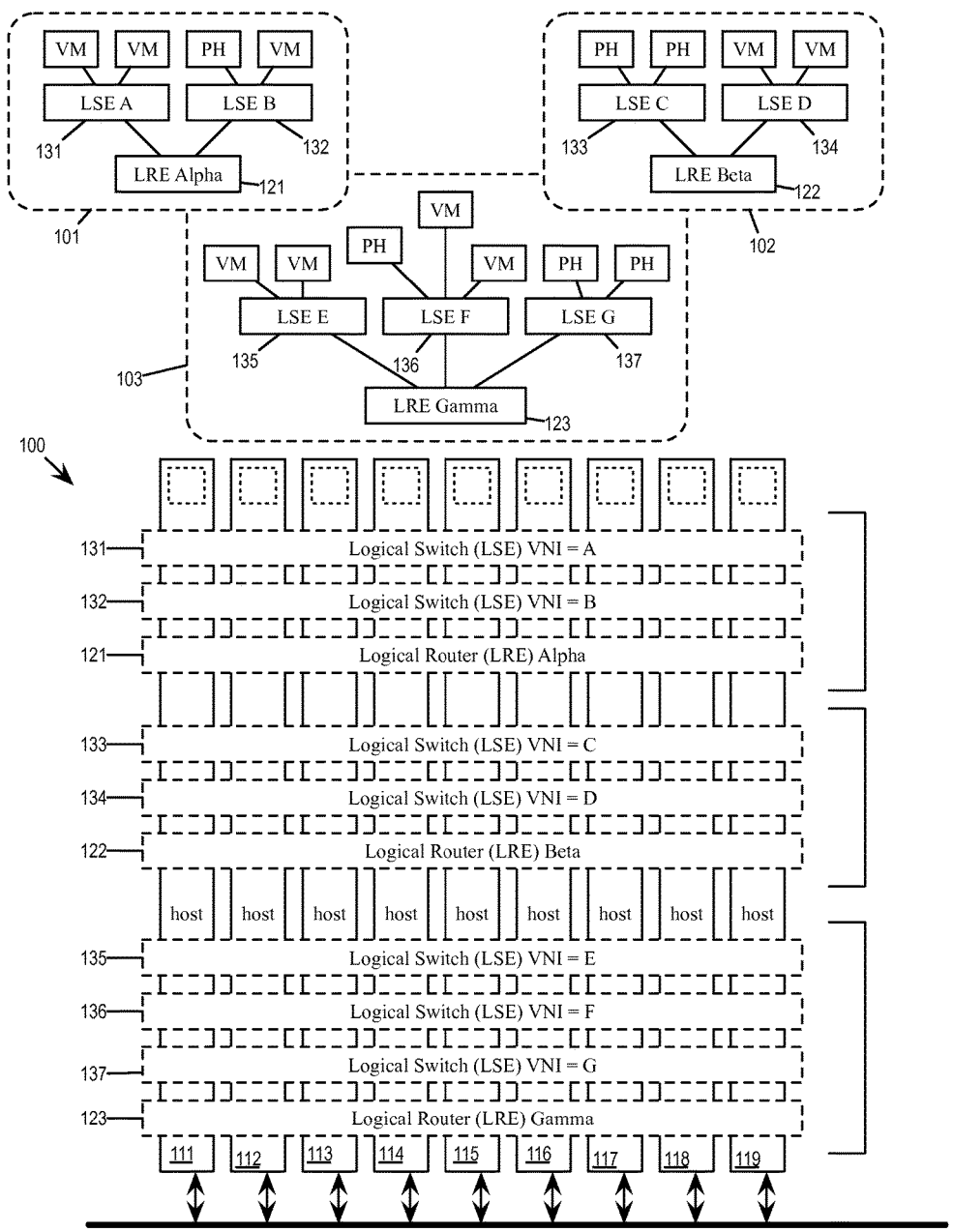
FIG. 1 illustrates a network virtualization infrastructure 100 that implements LREs and LSEs.

FIG. 1 illustrates a network virtualization infrastructure 100 that implements LREs and LSEs. In some embodiments, a network virtualization infrastructure is a datacenter in which many computing devices situate and serve as host machines. The datacenter also includes storage systems and communication systems for communicating with the external world, including other datacenters or user's own site. In some embodiments, the network virtualization infrastructure includes multiple datacenters (a multi-site environment), where at least some of the LREs and LSEs span multiple host machines in different datacenters.

As illustrated, the network virtualization infrastructure 100 includes host machines 110-119. Some of these host machines are operating virtualization software that allow them to operate one or more virtual machines (VMs). Some of these host machines are configured as designated instances for providing routing/switching services of the network virtualization infrastructure to physical hosts or routers (PHs).

These host machines are illustrated as implementing three different LREs: LRE alpha (121), LRE beta (122), and LRE gamma (123). All of these LREs span host machines 110-119, i.e., the LREs 121-123 operate in those host machine in a distributed fashion, where each host machine operates MPRE that are a local physical instance of the LREs 121-123.

Each of these LREs is a L3 router that connects multiple L2 segments. Each L2 segment is backed by a LSE, which performs L2 switching between network nodes in the segment (VMs and/or PHs). In some embodiments, each L2 segment has a network segment identifier, i.e., VNI (virtual network identifier, VLAN network identifier, or VXLAN network identifier) to distinguish it from other L2 segments. In some embodiments and in some places of this document, a L2 segment is referred to as a "VNI".

The LREs provide L3 routing between nodes that are in different L2 segments (i.e., serve by different LSEs). As illustrated, the LRE alpha 121 provides L3 connectivity between LSEs A and B (131 and 132), the LRE beta 122 provides L3 connectivity between LSEs C and D (133 and 134), and the LRE gamma 123 provides L3 connectivity between LSEs E, F, and G (135-137). Each of these LSEs also spans the host machines 111-119. In some embodiments, each host machine operates a MPSE and a set of MPREs. The MPSE performs L2 switching as required by each of the LSEs A, B, C, D, E, F, and G. The MPREs perform L3 routing between those L2 segments.

In some embodiments, each LRE and the L2 segments that it interconnects are collectively referred to as a logical network. As illustrated, the LRE alpha 121 interconnects the L2 segments of a logical network 101, the LRE beta 122 interconnects the L2 segments of a logical network 102, and the LRE gamma 123 interconnects the L2 segments of a logical network 103. In some embodiments, different logical networks of a datacenter can belong to different tenants of the datacenter, and the traffic of different logical networks are segregated from each other, even when packets of different logical networks are being handled by a same host machine.

Figure 2:
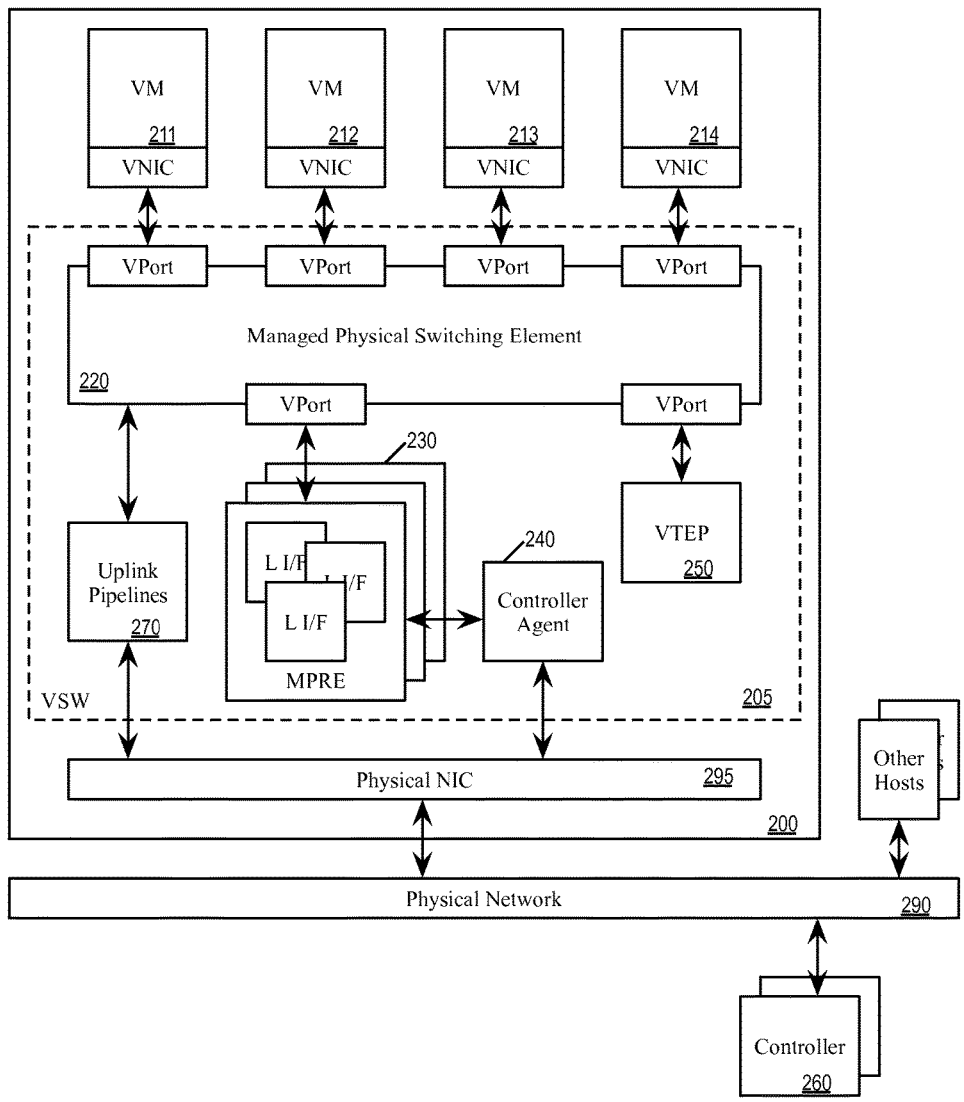
FIG. 2 illustrates a computing device that serves as a host machine.

FIG. 2 illustrates a computing device 200 that serves as a host machine for some embodiments of the invention. The computing device 200 is running virtualization software that implements a physical switching element and a set of physical routing elements. (i.e., MPSE and MPREs).

As illustrated, the computing device 200 has access to a physical network 290 through a physical NIC (PNIC) 295. The host machine 200 also runs the virtualization software 205 and hosts VMs 211-214. The virtualization software 205 serves as the interface between the hosted VMs and the physical NIC 295 (as well as other physical resources, such as processors and memory). Each of the VMs includes a virtual NIC (VNIC) for accessing the network through the virtualization software 205. Each VNIC in a VM is responsible for exchanging packets between the VM and the virtualization software 205. In some embodiments, the VNICs are software abstractions of physical NICs implemented by virtual NIC emulators.

The virtualization software 205 manages the operations of the VMs 211-214, and includes several components for managing the access of the VMs to the physical network (by implementing the logical networks to which the VMs connect, in some embodiments). As illustrated, the virtualization software includes several components, including a MPSE 220, a set of MPREs 230, a controller agent 240, a VTEP 250, and a set of uplink pipelines 270.

The VTEP (VXLAN tunnel endpoint) 250 allows the host machine 200 to serve as a tunnel endpoint for logical network traffic (e.g., VXLAN traffic). VXLAN is an overlay network encapsulation protocol. An overlay network created by VXLAN encapsulation is sometimes referred to as a VXLAN network, or simply VXLAN. When a VM on the host 200 sends a data packet (e.g., an ethernet frame) to another VM in the same VXLAN network but on a different host, the VTEP will encapsulate the data packet using the VXLAN network's VNI and network addresses of the VTEP, before sending the packet to the physical network. The packet is tunneled through the physical network (i.e., the encapsulation renders the underlying packet transparent to the intervening network elements) to the destination host. The VTEP at the destination host decapsulates the packet and forwards only the original inner data packet to the destination VM. In some embodiments, the VTEP module serves only as a controller interface for VXLAN encapsulation, while the encapsulation and decapsulation of VXLAN packets is accomplished at the uplink module 270.

The controller agent 240 receives control plane messages from a controller or a cluster of controllers. In some embodiments, these control plane message includes configuration data for configuring the various components of the virtualization software (such as the MPSE 220 and the MPREs 230) and/or the virtual machines. In the example illustrated in FIG. 2, the controller agent 240 receives control plane messages from the controller cluster 260 from the physical network 290 and in turn provides the received configuration data to the MPREs 230 through a control channel without going through the MPSE 220. However, in some embodiments, the controller agent 240 receives control plane messages from a direct data conduit (not illustrated) independent of the physical network 290. In some other embodiments, the controller agent receives control plane messages from the MPSE 220 and forwards configuration data to the router 230 through the MPSE 220.

The MPSE 220 delivers network data to and from the physical NIC 295, which interfaces the physical network 290. The MPSE also includes a number of virtual ports (vPorts) that communicatively interconnects the physical NIC with the VMs 211-214, the MPREs 230 and the controller agent 240. Each virtual port is associated with a unique L2 MAC address, in some embodiments. The MPSE performs L2 link layer packet forwarding between any two network elements that are connected to its virtual ports. The MPSE also performs L2 link layer packet forwarding between any network element connected to any one of its virtual ports and a reachable L2 network element on the physical network 290 (e.g., another VM running on another host). In some embodiments, a MPSE is a local instantiation of a logical switching element (LSE) that operates across the different host machines and can perform L2 packet switching between VMs on a same host machine or on different host machines. In some embodiments, the MPSE performs the switching function of several LSEs according to the configuration of those logical switches.

The MPREs 230 perform L3 routing on data packets received from a virtual port on the MPSE 220. In some embodiments, this routing operation entails resolving L3 IP address to a next-hop L2 MAC address and a next-hop VNI (i.e., the VNI of the next-hop's L2 segment). Each routed data packet is then sent back to the MPSE 220 to be forwarded to its destination according to the resolved L2 MAC address. This destination can be another VM connected to a virtual port on the MPSE 220, or a reachable L2 network element on the physical network 290 (e.g., another VM running on another host, a physical non-virtualized machine, etc.).

As mentioned, in some embodiments, a MPRE is a local instantiation of a logical routing element (LRE) that operates across the different host machines and can perform L3 packet forwarding between VMs on a same host machine or on different host machines. In some embodiments, a host machine may have multiple MPREs connected to a single MPSE, where each MPRE in the host machine implements a different LRE. MPREs and MPSEs are referred to as "physical" routing/switching element in order to distinguish from "logical" routing/switching elements, even though MPREs and MPSE are implemented in software in some embodiments. In some embodiments, a MPRE is referred to as a "software router" and a MPSE is referred to a "software switch". In some embodiments, LREs and LSEs are collectively referred to as logical forwarding elements (LFEs), while MPREs and MPSEs are collectively referred to as managed physical forwarding elements (MPFEs).

In some embodiments, the MPRE 230 includes one or more logical interfaces (LIFs) that each serves as an interface to a particular segment (L2 segment or VXLAN) of the network. In some embodiments, each LIF is addressable by its own IP address and serve as a default gateway or ARP proxy for network nodes (e.g., VMs) of its particular segment of the network. In some embodiments, all of the MPREs in the different host machines are addressable by a same "virtual" MAC address (or vMAC), while each MPRE is also assigned a "physical" MAC address (or pMAC) in order indicate in which host machine does the MPRE operate.

The uplink module 270 relays data between the MPSE 220 and the physical NIC 295. The uplink module 270 includes an egress chain and an ingress chain that each performs a number of operations. Some of these operations are pre-processing and/or post-processing operations for the MPRE 230. The operations of LIFs, uplink module, MPSE, and MPRE are described in U.S. patent application Ser. No. 14/137,862 filed on Dec. 20, 2013, titled "Logical Router", published as U. S. Patent Application Publication 2015/0106804.

As illustrated by FIG. 2, the virtualization software 205 has multiple MPREs for multiple different LREs. In a multi-tenancy environment, a host machine can operate virtual machines from multiple different users or tenants (i.e., connected to different logical networks). In some embodiments, each user or tenant has a corresponding MPRE instantiation of its LRE in the host for handling its L3 routing. In some embodiments, though the different MPREs belong to different tenants, they all share a same vPort on the MPSE 220, and hence a same L2 MAC address (vMAC or pMAC). In some other embodiments, each different MPRE belonging to a different tenant has its own port to the MPSE.

The MPSE 220 and the MPRE 230 make it possible for data packets to be forwarded amongst VMs 211-214 without being sent through the external physical network 290 (so long as the VMs connect to the same logical network, as different tenants' VMs will be isolated from each other). Specifically, the MPSE performs the functions of the local logical switches by using the VNIs of the various L2 segments (i.e., their corresponding L2 logical switches) of the various logical networks. Likewise, the MPREs perform the function of the logical routers by using the VNIs of those various L2 segments. Since each L2 segment/L2 switch has its own a unique VNI, the host machine 200 (and its virtualization software 205) is able to direct packets of different logical networks to their correct destinations and effectively segregates traffic of different logical networks from each other.

Figure 3A:
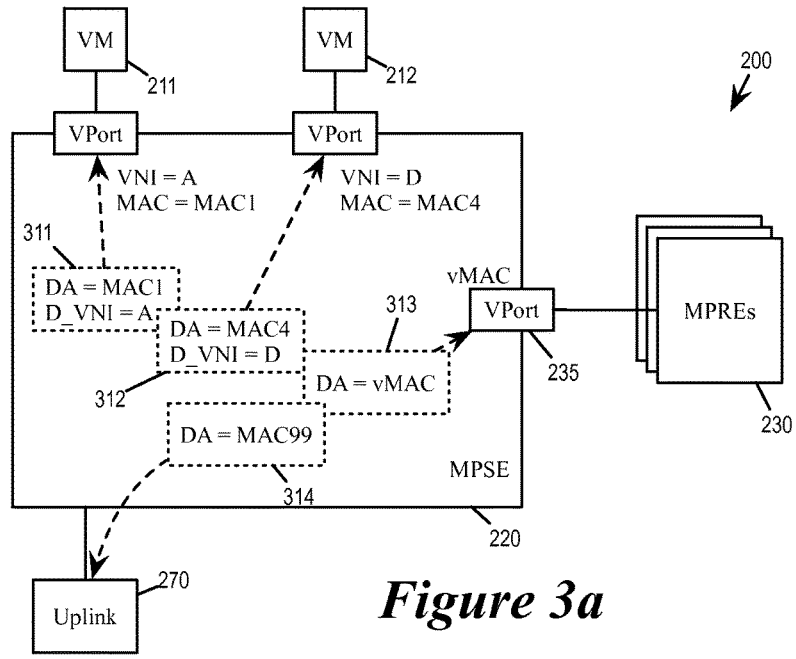
FIG. 3a illustrates operations of a physical switching element (MPSE).

FIG. 3*a* illustrates operations of a physical switching element (MPSE) according to some embodiments of the invention. The figure illustrates several example packets from various sources that have arrived at the MPSE 220 of the host machine 200. The MPSE 220 in turn performs switching operations to send those packets to their corresponding destinations. These packets can come from VMs that are being operates by the virtualization software 205 or traffic from outside of the host machine, including network traffic from PHs for which the host machine 200 is the designated instance.

FIG. 3*a* illustrates example L2 switching operations for four example packets 311-314 that have arrived at the MPSE 220. These packets arrived at the MPSE through various ports of the MPSE, including ports for the VM 211, the VM 212, the MPREs 230 (vPort 235), and the uplink 270 (to the physical network). Each of these ports is associated with a MAC address. Some of these ports are also associated with a VNI, which identifies the L2 segment associated with the port. In some embodiments, a packet is forwarded to a switch port to be sent out if the packet is tagged as having the same MAC address and VNI as that of the port (e.g., if the destination MAC address and the destination VNI of the packet matches that of the port).

As illustrated, the port for the VM 211 is associated with MAC address "MAC1" and VNI "A", and the packet 311 is forwarded there because it has the corresponding destination MAC address "MAC1" and VNI "A". Likewise, the port for the VM 212 is associated with MAC address "MAC4" and VNI "D", and the packet 312 is forwarded there because it has the corresponding destination MAC address "MAC4" and VNI "D". It is worth noting that VNI "A" and VNI "D" belong to different logical networks of different tenants (the logical networks 101 and 102 respectively), and yet they are segregated by the MPSE 220 according to their respective MAC addresses and VNIs.

The port for the MPREs 230 is associated with a "virtual" MAC address, or vMAC. In some embodiments, every host machine in the network virtualization infrastructure is configured to recognize packets having a destination MAC address "vMAC" as bound for routing by the MPREs of the host machine. In some embodiments, the uplink module of a host machine would override the destination MAC address field of incoming packets from the physical network with "vMAC" in order to ensure that the packet is sent to the MPREs for L3 routing. In the illustrated example, the packet 313 has destination MAC "vMAC", so it is forwarded to the MPREs 230 through the MPRE port 235.

The port for the uplink 270 is not associated with any particular MAC address or VNI. In some embodiments, packets with MAC addresses that do not match any of the ports of the MPSE would be forwarded to the uplink 270. The packet 314 has MAC address "MAC99", which do not match any of the ports of the MPSE. It is therefore forwarded out of the host machine through the uplink 270 (so perhaps to reach another host machine or physical host).

Figure 3B:
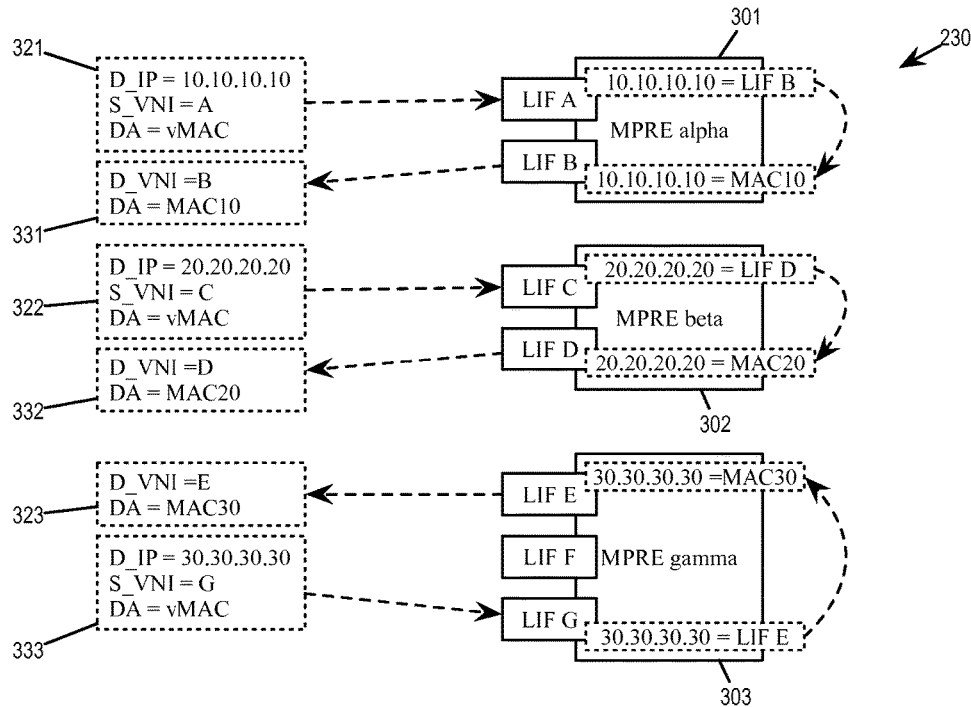
FIG. 3b illustrates operations of a physical switching element (MPRE).

FIG. 3*b* illustrates operations of the physical routing elements (MPREs) according to some embodiments of the invention. The figure illustrates several example packets that were forwarded to the MPREs 230 (by the MPSE 220) of the host machine 200. The MPREs 230 in turn performs L3 routing operations on those packets so that the MPSE 220 can forward them to the corresponding destinations.

FIG. 3*b* illustrates example L3 routing operations for three example packets 321-323 that have arrived from the MPSE 220 through the MPRE port 235. These packets all have destination MAC address as "vMAC". The MPREs 230 in turn perform L3 routing operations on the packets 321-323 to produce routed packets 331-333. The routed packets are return to the MPSE 220 to be forwarded to their destinations.

As mentioned, each host machine is configured to implement a MPRE for each of the LREs in some embodiments. For the example network virtualization infrastructure 100, each host machine is configured to have MPREs that correspond to LREs alpha, beta, and gamma (the LREs 121-122). Specifically, packets of the logical network 101 would be handled by a MPRE 301 of the LRE alpha (MPRE alpha), packets of the logical network 102 would be handled by a MPRE 302 of the LRE beta (MPRE beta), and packets of the logical network 103 would be handled by a MPRE 303 of the LRE gamma (MPRE gamma). This is unlike the case of MPSE, wherein one physical switching element handles L2 operations of all LSEs, regardless of which tenant/logical network the LSEs belong to.

In some embodiments, each MPRE has several logical interfaces (LIFs) that are local instantiations of the LIFs of the corresponding LRE. Each LIF is for interfacing a L2 segment (i.e., LSE) and handling the network traffic to and from the L2 segment. Specifically, the MPRE 301 (alpha) has LIFs A and B for L2 segments 131 and 132 (LSEs A and B), the MPRE 302 (beta) has LIFs C and D for L2 segments 133 and 134 (LSEs C and D), and MPRE 303 (gamma) has LIFs E, F, and G for L2 segments 135-137 (LSEs E, F, and G).

In some embodiments, each LIF of a MPRE can function as an inbound LIF or an outbound LIF for the MPRE. An inbound LIF is a LIF that is receiving an incoming packet from its corresponding L2 segment, while an outbound LIF is a LIF that is delivering the routed packet to its corresponding L2 segment. In the illustrated example, LIFs A, C, and G are operating as inbound LIFs, while LIFs B, D, and E are operating as outbound LIFs. In some embodiments, an inbound LIF processes the incoming packet by identifying an outbound LIF for the packet (by e.g., routing table lookup), while the outbound LIF completes the routing operation by identifying the next hop destination MAC address (by e.g., routing table lookup). In other words, the MPRE performs L3 routing by identifying the next hop's (or the destination) VNI as well as the next hop's MAC address by using its LIFs.

In the example illustrated in FIG. 3*b*, for the packet 321, the MPRE 301 at its inbound LIF A uses the destination IP address "10.10.10.10" to look up its routing table and identifies LIF B as the outbound LIF. The MPRE 301 at its LIF B then identifies a "MAC10" as the next hop MAC address. The MPRE 301 accordingly produces a routed packet 331 for the next hop, whose destination VNI is "B" and destination MAC address is "MAC10". Likewise, for the packet 322, the MPRE 302 at its inbound LIF C uses the destination IP address "20.20.20.20" to identify LIF D as the outbound LIF. The MPRE 302 at its LIF D then identifies a "MAC20" as the next hop MAC address and produces the routed packet 332 with VNI "D" and destination MAC address "MAC20". For packet 323, the MPRE 303 at its inbound LIF G uses the destination IP address "30.30.30.30" of the packet 323 to identify its LIF E as the outbound LIF. The MPRE 303 at its LIF E then identifies "MAC30" as the next hop MAC address and produces the routed packet 333 with VNI "E" and destination MAC address "MAC30".

As mentioned, each LIF corresponds to a L2 segment, i.e., a particular VNI. In some embodiments, such a L2 segment can be an IP subnet, a VXLAN overlay network, or other types of network segments. In some embodiments, such a L2 segment can encompass multiple IP subnets, whether contiguous or disjointed. In some embodiments, each logical interface is assigned its own set of identifiers (e.g., IP addresses or overlay network identifier) that is unique within the network virtualization environment 100.

Figure 4:
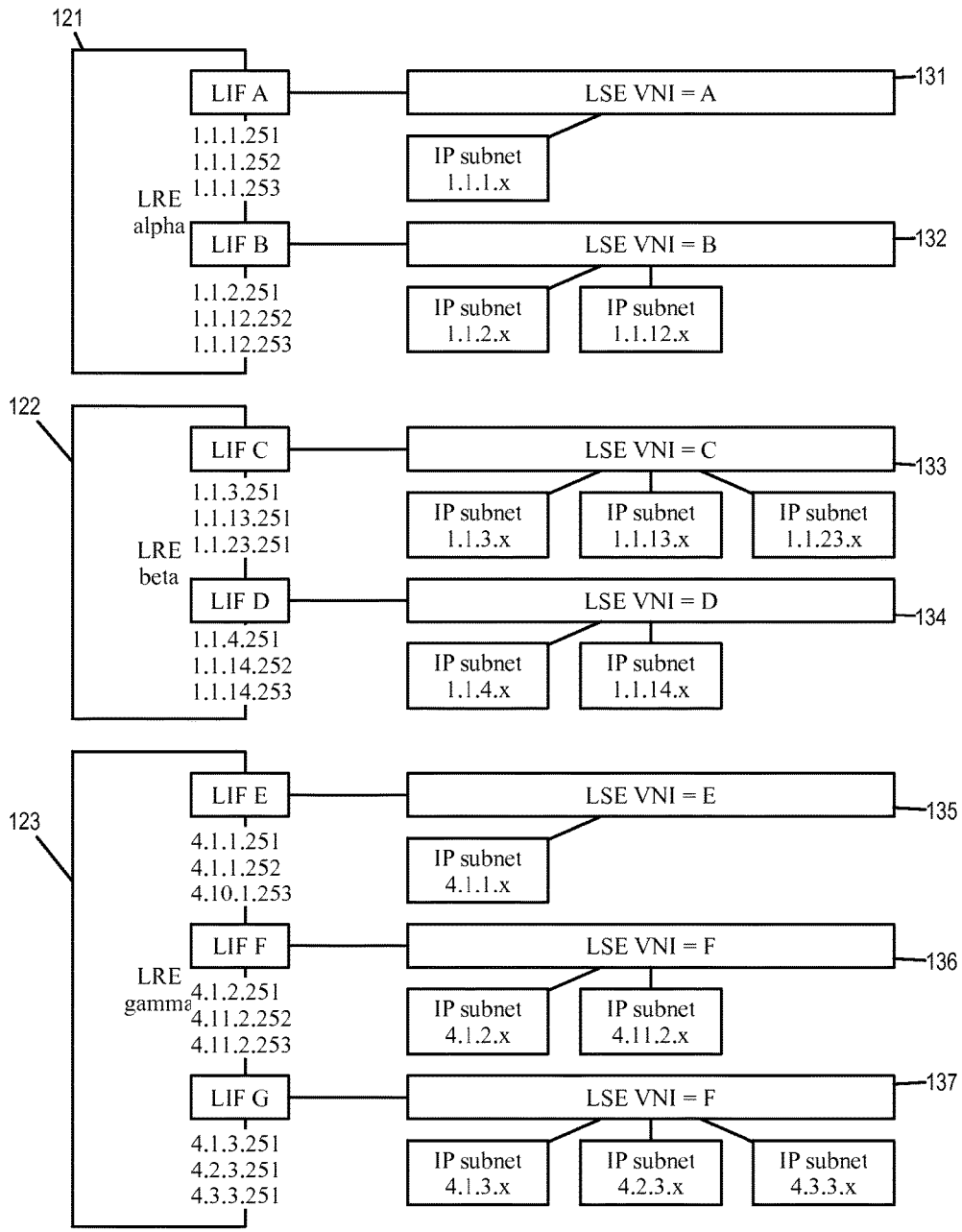
FIG. 4 illustrates the correspondence of LIFs with L2 segments.

FIG. 4 illustrates the correspondence of LIFs with L2 segments. The figure illustrates LIFs that interface network segments that include one or more IP subnets. As illustrated, some of the network segments (e.g., network segments A and E) include only one IP subnet. A LIF interfacing such a network segment have all of its LIF addresses in one IP subnet. For example, the network segment A only includes network nodes in IP subnet 1.1.1.x, and the LIF addresses for its corresponding LIF (LIF A) are also all in the IP subnet 1.1.1.x (i.e., 1.1.1.251, 1.1.1.252, 1.1.1.253). On the other hand, some of the network segments include multiple IP subnets. For example, the network segment B includes IP subnets 1.1.2.x and 1.1.12.x, while the segment C includes IP subnets 1.1.3.x, 1.1.13.x, and 1.1.23.x. In some embodiments, a LIF of a network segment also has LIF IP addresses in those multiple subnets of the network segments. For example, LIF B has IP addresses in IP subnet 1.1.2.x (1.1.2.251) as well as in IP subnet 1.1.12.x (1.1.12.252 and 1.1.12.253). In some of these embodiments, network nodes in a particular IP subnet uses only LIF addresses in the same IP subnet when accessing the LIF. For example, in some embodiments, VMs in subnet 1.1.14.x of segment D uses only the addresses 1.1.14.252 or 1.1.14.253 to address LIF D but not 1.1.4.251, even though 1.1.4.251 is also an address of the same LIF.

In some embodiments, the IP addresses of a LIF need not correspond exactly with the IP subnets in the LIF's network segment. For example, a LIF may have an IP address that is not in any of the network segment's subnets (e.g., the network segment E does not have IP subnet that encompasses the LIF address 4.10.1.253 in LIF E), or a LIF may have a subnet that does not have at least one LIF address that is in that subnet (e.g., LIF H does not have a LIF address in the subnet 4.1.14.x).

The figure also illustrates assignment of IP address to LIFs. For example, LIF A of LRE alpha 121 is assigned IP addresses 1.1.1.251, 1.1.1.252, and 1.1.1.253, and LIF F of LRE gamma 123 is assigned IP addresses 4.1.2.251, 4.11.2.252, and 4.11.2.253. Each of these LIF identifiers can serve as a destination address for network traffic, in other words, the multiple IP addresses (or identifiers) of a LIF allows the LIF to appear as multiple different network traffic destinations. For example, in some embodiments, each LIF IP address serves as an address of a default gateway or ARP proxy for network nodes of its particular network segment. Having multiple IP addresses per LIF provides the network nodes in the corresponding network segments a list of gateways or proxies to choose. IP interfaces of LIFs are described in U.S. patent application Ser. No. 14/227,959 filed on Mar. 27, 2014, titled "Ingress ECMP in Network virtualization infrastructure".

In the examples illustrated in FIGS. 1-4, all of the LREs and LSEs span all of the host machines. In some embodiments, this means the LIFs of the LRE are active across all of the host machines. In some embodiments, a host machine that is spanned by a LSE means that the LSE is active on that host machine, and the MPRE (local instance of LRE) is actively performing routing operations to and from the L2 segment served by the LSE. Furthermore, in the examples illustrated in FIGS. 1-4, no two tenants (i.e., no two LREs) share a LSE, have access to a same L2 segment, or use a common VNI. In other words, the system is able to segregate packet traffic between different tenants/LREs by relying on VNIs, since every VNI uniquely belong to only one logical network/tenant.

Several more embodiments of the invention are described below. Section I describes a virtual distributed routing environment in which some of the LSEs span only some of the host machines. Section II describes a network virtualization infrastructure in which some of the LREs/tenants share one or more VNIs. Section III describes ECMP operations that are based on rewrite MAC or LIF MACs. Section IV describes some of the processes performed in the virtual distributed routing environment. Finally, section V describes an electronic system with which some embodiments of the invention are implemented.

I. Selectively Activated Logical Interfaces

As mentioned, a LRE has LIFs for interfacing various L2 segments. In some embodiments, these LIFs are responsible for performing the L3 routing operations by e.g., looking up forwarding tables for determining the next hop. In some embodiments, these L3 routing operations performed by the LIFs require significant computing and storage resources to configure, control, and monitor in order to ensure proper operations. For a L2 segment whose traffic necessarily go through only a subset of host machines of the virtual distributed routing environment, it is advantageous to configure only those host machines in the subset to perform the LIF operations for that L2 segment. However, it is also advantageous to maintain uniform configuration of logical entities (logical routers and logical switches) across all host machines participating in the virtual distributed routing environment.

In some embodiments, a LRE can have LIFs that are active in all host machines spanned by the LRE as well as LIFs that are active in only a subset of those spanned host machines. In some embodiments, a LIF that is active in only a subset of host machines while remaining dormant in other host machines is referred to as an intermediate LIF, or iLIF. This is in contrast to ordinary distributed LIF (or dLIF) that is active in all host machines spanned by the LRE. A host machine having an active LIF for a particular L2 segment would perform the L3 routing operations for network traffic related to that L2 segment. A host machine having an inactive LIF for the particular L2 segment would not perform L3 routing operations for the network traffic of the L2 segment.

As mentioned, a L2 segment can be an overlay network like VXLAN, or a VLAN IP subnet. In some embodiments, a VXLAN overlay network interconnects VMs that can be provisioned on any of the host machine. A LSE that correspond to a VXLAN is therefore configured to be active on all host machines, and the LIF that correspond to the VXLAN is active on all host machines to perform the corresponding L3 routing tasks. A L2 segment can also be an IP subnet, i.e., a VLAN. In some embodiments, a VLAN segment is physically confined to a host machine or a subset of the host machines, such as when the VLAN segment is provided by a physically external network that the logical network accesses through an edge. This edge is in some embodiments provided by one host machine or a rack of host machines. The VNI associated with the VLAN (i.e., the edge), need only be processed by those edge host machines. In some embodiments, the LIF that corresponds to such a VLAN is active only on those subset of edge host machines.

Figure 5:
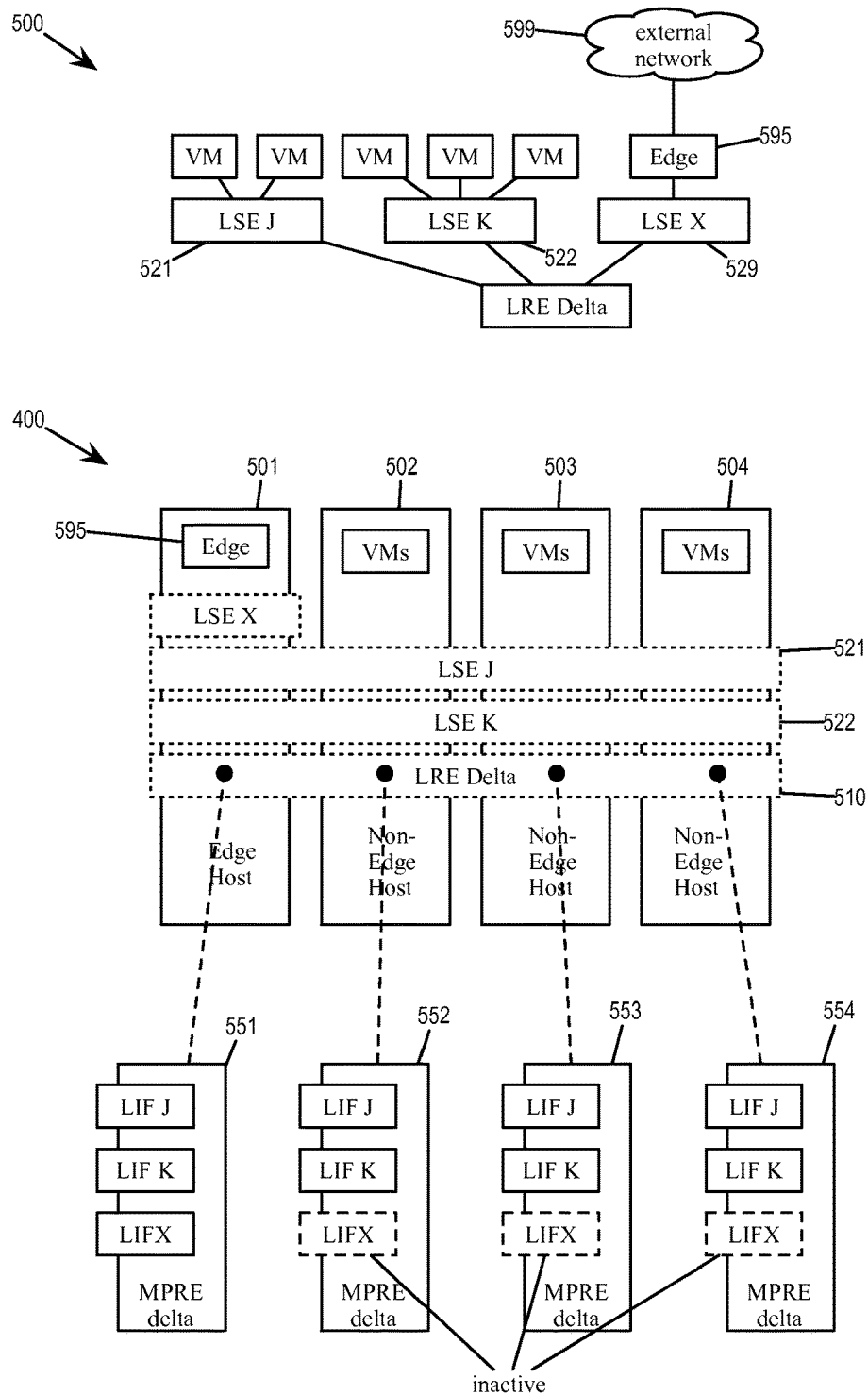
FIG. 5 illustrates a network virtualization infrastructure in which a LIF is active in only one of the host machines.

FIG. 5 illustrates a network virtualization infrastructure implementing a virtual distributed routing environment 400 in which a LIF is active in only one of the host machines. The virtual distributed routing environment 400 is implementing a logical network 500 that has a VLAN L2 segment corresponding to an edge 595 to an external network. As illustrated, the logical network 500 includes a LRE 510 interconnecting L2 segments 521, 522, and 529 (served by LSEs for VNIs "J", "K", and "X", respectively). LSEs "J" and "K" serves VMs that can be provisioned on any host machines of the datacenter, while LSE "X" provides the access to the edge 595 to an external network 599.

The figure also illustrates the logical network 500 being implemented over host machines 501-504 of the network virtualization infrastructure 400. The host machine 501 is serving the edge 595. As illustrated, the LRE 510 (LRE delta) spans host machines 501-504. The LRE has a corresponding LIF for each of the L2 segments (LIF "J", LIF "K", and LIF "X"). L2 segments 521 and 522 are active in all host machines 501-504, while the L2 segment 529 is active only on the host machine 501. Correspondingly, LIF J and LIF K are active in all host machines 501-504, while the LIF X is active only in the host machine 501.

Since the host machine 501 is the only host machine that is physically interfacing the external network 599 and is the only machine where L2 traffic of VNI "X" is conducted (because it is providing the edge 595), the system makes the host machine 501 to be the only host machine at which LIF X is active. In all other host machines, the LIF X is inactive (illustrated with dash lines). Specifically, the MPRE 551 running on the host machine 501 has an active LIF "X", while the MPREs 552-553 running on host machines 502-504 have inactive LIF "X". In some embodiments, an inactive LIF does not participate in L3 routing operation, and the system therefore need not devote computing and storage resources in controlling and maintaining it.

As illustrated, the edge 595 serves as the gateway of the logical network 500 with the external network 599. In other words, the edge 595 is not only being accessed by network nodes of VNI "X", but also network nodes on other VNIs "J" and "K". For those VMs of other VNIs running on the host machine 501, the routing is trivial (i.e., similar to those described above by reference to FIG. 3) since the LIF for VNI "X" is active on host machine 501 along with LIFs for "J" and "K". However, for VMs that are operating on other host machines 502-504 with inactive LIF X, the traffic destined for the external network 599 still has to go through the edge 595, which is on L2 segment with VNI "X". Some embodiment therefore provide methods or logical conduits that allow traffic from host machines with inactive LIF "X" to reach the L2 segment "X".

In order to perform L3 routing into a particular VNI that is active only on a subset of the host machine (i.e., a L2 segment whose LIF is an iLIF), some embodiments use a backplane conduit to send traffic from a host machine with an inactive LIF for the particular VNI to a host machine with an active LIF for the particular VNI. Within this backplane conduit, a special L2 MAC address is used to identify the host machine that has the active LIF for the particular VNI in some embodiments. In the example of FIG. 5, where VNI "X" has an active LIF in the host machine 501 and inactive LIFs in host machines 502-504, packets from host machine 502-504 destined for VNI "X" is delivered to the host machine 501 through the backplane conduit.

Figure 6:
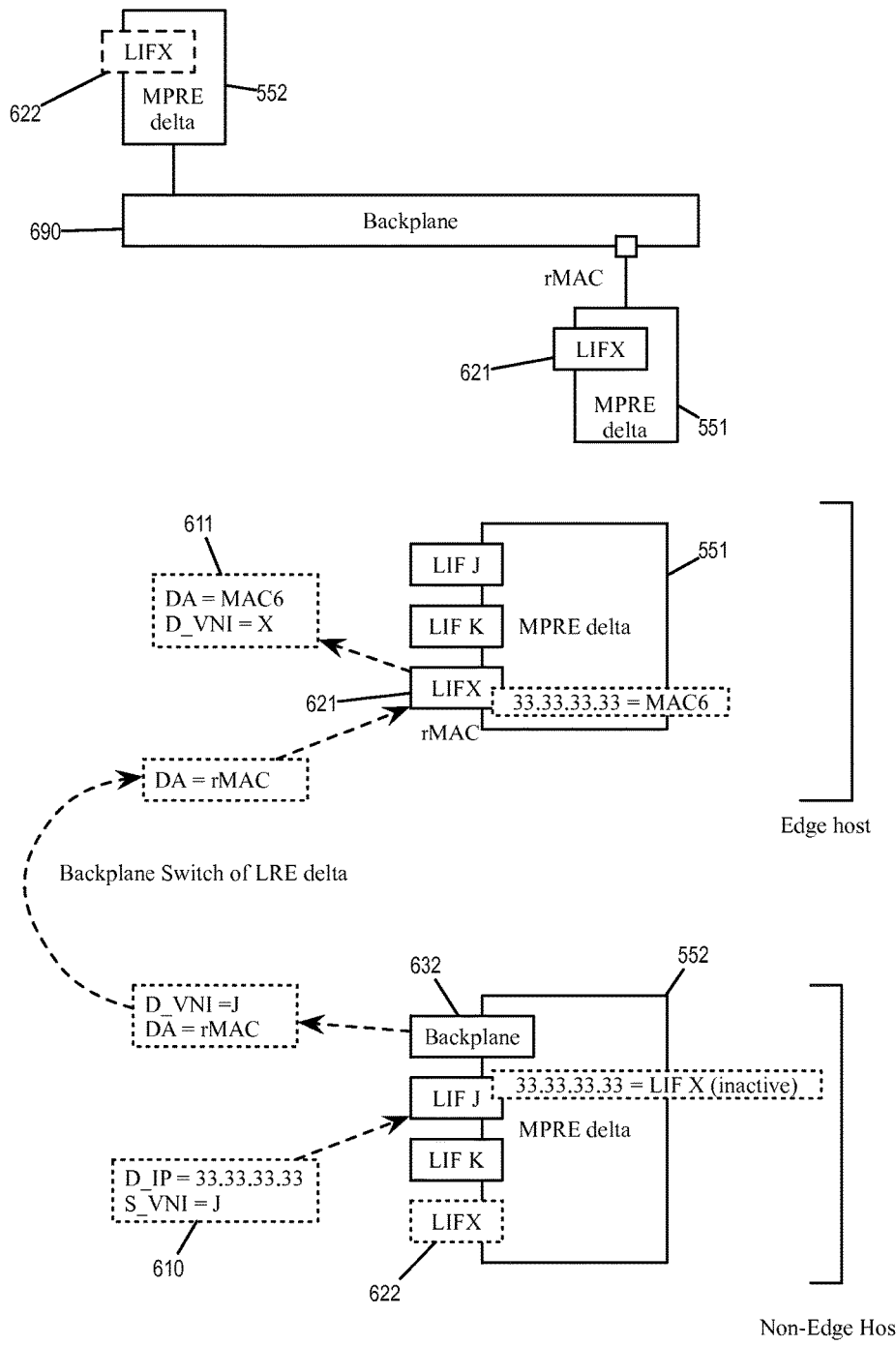
FIG. 6 illustrates routing by iLIF for a particular VNI from a host machine with an inactive LIF to a host machine with an active LIF.

FIG. 6 illustrates routing by iLIF for a particular VNI from a host machine with an inactive LIF to a host machine with an active LIF. Specifically, the figure illustrates a backplane conduit 690 that is used to deliver a packet from the host machine 502 (where the iLIF for VNI "X" is inactive) to the host machine 501 (where the iLIF for VNI "X" is active).

The backplane conduit 690 is a special data conduit for delivering data between host machines. Such a backplane conduit is a software construct implemented by the virtualization software running on the host machines in some embodiments. In some embodiments, such backplane conduit is implemented by packet encapsulation schemes for segregating network traffic between regular data plane and the backplane. In some embodiment, a backplane conduit is implemented as a logical switch that is active only at the host machine with the active LIF.

In this case, the backplane conduit 690 is used to bring traffic from the MPRE 552 of the host machine 502 to the MPRE 551 of the host machine 501. As illustrated, the backplane conduit works like a L2 logical switch, it has endpoints or ports that are identified by MAC addresses. In some embodiments, a host machine with an active LIF is assigned a MAC address so it is uniquely identifiable in the backplane conduit as a destination. Such a MAC address is referred to as a "rMAC" ("routing" MAC, "re-route" MAC, or "re-write" MAC) in some embodiments. In this case, the host machine 501 as the host machine having an active LIF for VNI "X" is assigned an rMAC, and packets entering the backplane conduit 690 having the rMAC as destination MAC would reach the host machine 501, particularly at its active LIF X.

FIG. 6 also illustrates the L3 routing operation involving active and inactive LIFs. Specifically, the figure illustrates the routing of a packet 610 from VNI "J" to the VNI "X". The packet 610 is produced by the host machine 502 from a VM that is on L2 segment with VNI "J". Its destination IP address is "33.33.33.33". The packet 610 enters the MPRE 552 of the LRE delta at the host machine 502 through LIF "J". LIF "J" performs routing table look up on the IP address "33.33.33.33" and identifies LIF X as the next the next hop. Unfortunately, LIF X is inactive (622) at the host machine 502/MPRE 552, so the MPRE 552 sends the packet 610 to a backplane LIF 632 for the backplane conduit 690. The backplane LIF 632 rewrite the destination MAC address of the packet 610 such that the rMAC of the active LIF X (621) at the host machine 501 becomes the destination MAC address. The packet then reaches the active LIF X 621 through the backplane based on the rMAC. The LIF X then performs routing table look up and determines that the next hop is MAC address "MACE" with VNI "X". The routed packet 611 is then sent to its destination through the MPSE (not illustrated) of the host machine 501 on the way to its next hop.

II. Different Tenants Sharing Common L2 Segment

The example of FIGS. 5-6 illustrates the use of rMAC by only one tenants. In some embodiments, multiple different tenants (i.e., multiple different LREs) have LIFs that are active on only some of the host machines. When different tenants are each using different, non-overlapping set of VNIs, the solutions discussed in Section I would extend trivially since a host machine can always distinguish the traffic of different tenants according to their different VNIs. However, in some embodiments, different tenants of a same virtual distributed routing environment (one datacenter or multi-site environment) would share common resources, such as common edge services to an external network, or a common VLAN IP subnet provided by a network service provider. In some embodiments, the same VNI of the common resource is used by the multiple tenants that share the common resource, and the different tenants' corresponding LREs would have active LIFs for the same VNI, even at the same host machine.

Figure 7:
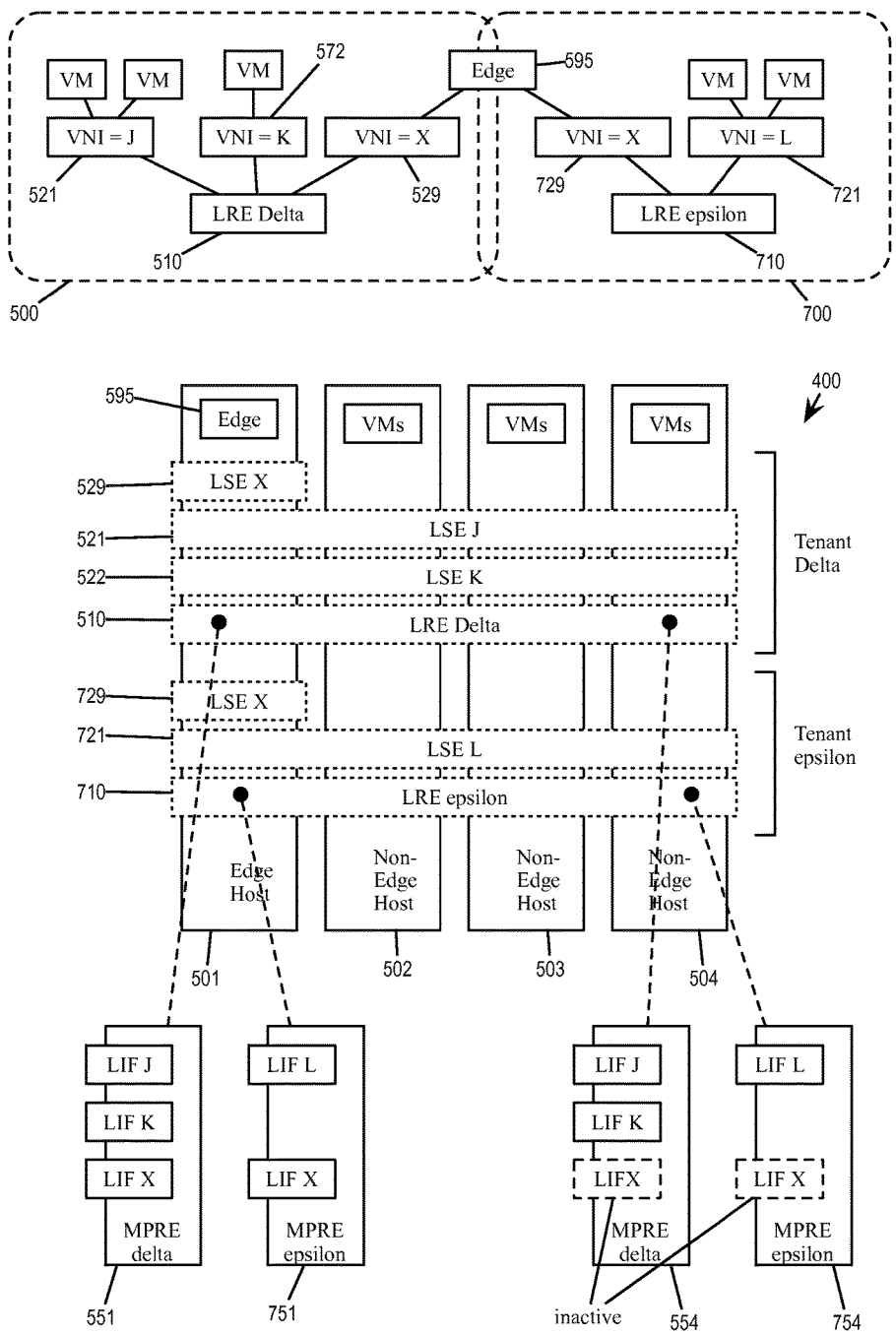
FIG. 7 illustrates a network virtualization infrastructure in which multiple different LREs have iLIFs for a same VNI.

FIG. 7 illustrates a network virtualization infrastructure in which multiple different LREs have iLIFs for a same VNI. The figure illustrates the network virtualization infrastructure 400 having host machines 501-504 that is implementing the logical network 500 based on the LRE 510 for a first tenant (tenant delta), which has a L2 segment with VNI "X" for providing the edge 595. The same host machines 501-504 are also implementing a second logical network 700 based on a LRE 710 for a second tenant (tenant epsilon). The LRE 710 provides L3 routing between L2 segments 721 and 729. The L2 segment 721 having VNI "L" is for VMs that can be provisioned on any host machine. The L2 segment 729 on the other hand is for accessing the same edge 595 and has the same VNI "X" as the L2 segment 529. In other words, the tenant delta and the tenant epsilon are using a same VNI "X" for accessing a common resource in the edge 595.

As illustrated, the edge 595 is provided by the host machine 501, and both the tenant delta and the tenant epsilon have an active LIF for VNI "X" at the host machine 501. Other host machines 502-504 do not conduct traffic for VNI "X", and LIF X is inactive on those other host machines. Consequently, the MPRE 551 (for tenant delta or LRE 510) and the MPRE 751 (for tenant epsilon or LRE 710) at the host machine 501 have active LIF X, while MPREs in other host machines (e.g., MPRE 554 and 754 at host machine 504) have inactive LIFs for "X".

As mentioned, the packets for a LIF that is active on some host machines while dormant on some host machines are delivered by a backplane conduit to a host machine where the LIF is active. However, since two tenants may each have an active LIF with the same VNI on the same host machine, the traffic of the two different tenants have to be segregated. In some embodiments, active LIFs for different tenants have different rMACs, even when the LIFs have the same VNI. In some other embodiments, each tenant has its own backplane conduit such that the traffic to active LIFs belonging to different tenants/LREs are segregated by their respective conduits.

Figure 8:
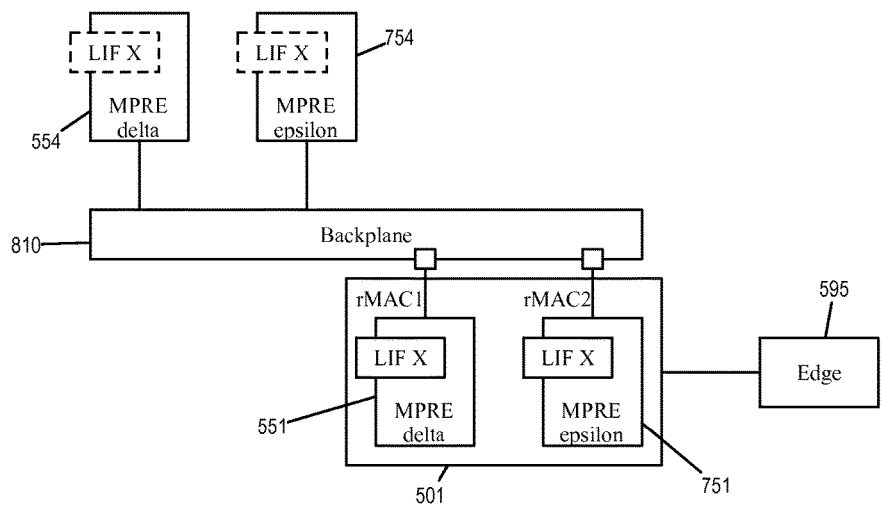
FIG. 8 illustrates a backplane conduit that is shared by different tenants, where LIFs of different tenants, even if for a same VNI, have different rMACs.

FIG. 8 illustrates a backplane conduit 810 that is shared by different tenants, where LIFs of different tenants, even if for a same VNI, have different rMACs. As illustrated, the network virtualization infrastructure 400 is implementing a backplane conduit 810. The conduit 810 allows control plane access to various host machines, including the MPREs of various LREs/tenants/logical networks. As illustrated, both the MPRE 554 of the tenant delta and the MPRE 754 of the tenant epsilon can inject packets into the backplane conduit, and both the MPRE 551 of the tenant delta and the MPRE 751 of the tenant epsilon (at the host machine 501 having the edge 595) can receive packets from the backplane conduit 810. Specifically, the MPRE delta 551 is associated with rMAC "rMAC1", while the MPRE epsilon is associated with rMAC "rMAC2". In other words, the edge host machine 501 is able to distinguish packet traffic destined for LIF X of tenant delta from packet traffic destined for LIF X of tenant epsilon, even through they are both LIFs of a same L2 segment with the same VNI "X".

Figure 9:
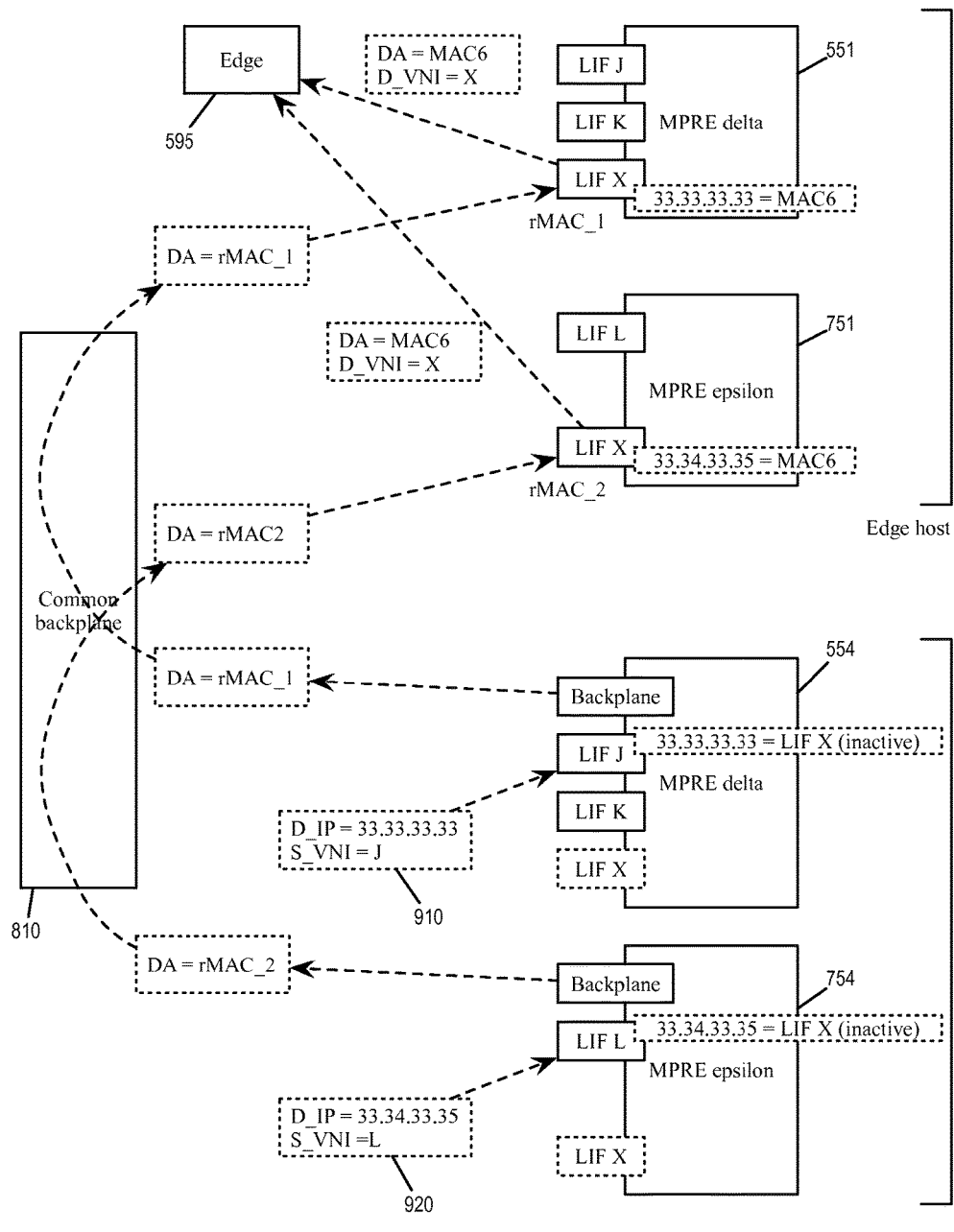
FIG. 9 illustrates how the different rMACs are used to segregate traffic between different tenants in a common backplane conduit.

FIG. 9 illustrates how the different rMACs are used to segregate traffic between different tenants in a common backplane conduit. Specifically, the figure shows the L3 routing of packet 910 and 920 through the network virtualization infrastructure 400, the packet 910 belonging to the tenant delta while the packet 920 belonging to the tenant epsilon. Both packets 910 and 920 are identified as packets to be routed by iLIFs with VNI "X" (according to forwarding table), as they are both destined for the edge 595. The packet 910 reaches its active LIF X in MPRE 551 of the edge host machine 501 through the backplane conduit 810 by using "rMAC1". The packet 920 reaches its active LIF X in MPRE 751 of the edge host machine 501 through the backplane conduit 810 by using "rMAC2".

In some embodiments, it is advantageous to avoid assigning too many new MAC addresses for forwarding packets to active LIFs from inactive LIFs. In some embodiments, each tenant or LRE has its own backplane conduit such that different tenants can safely use the same rMAC address without blending backplane traffic belonging to different tenants.

Figure 10:
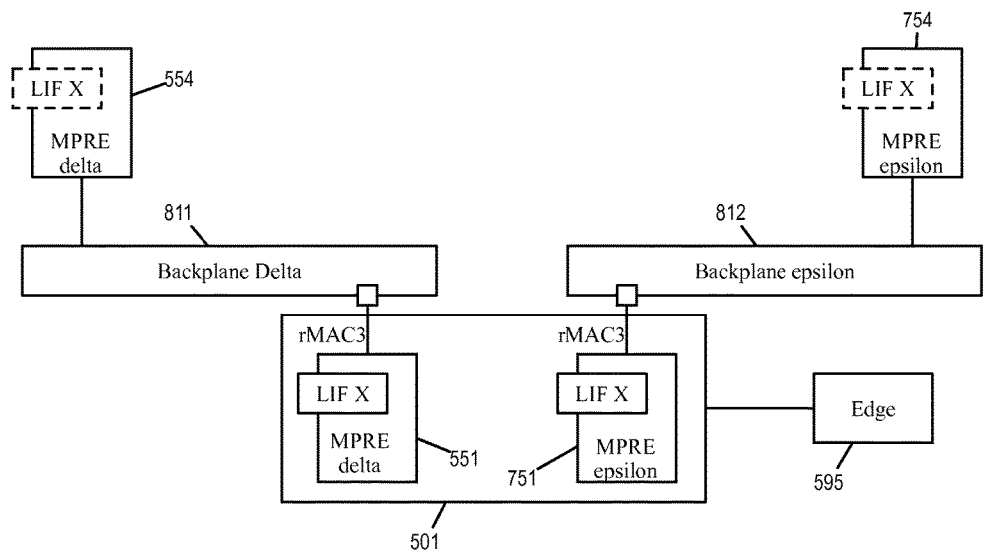
FIG. 10 illustrates LREs that each has its own backplane conduit such that a same rMAC can be used by different LREs.

FIG. 10 illustrates LREs that each has its own backplane conduit such that a same rMAC can be used by different LREs (specifically by their iLIFs). As illustrated, the network virtualization infrastructure 400 is implementing a backplane conduit 811 for the tenant delta and a separate backplane conduit 812 for the tenant epsilon. The backplane conduit 811 inter connects the MPREs (or their LIFs) of the different host machines for the LRE 510 (for tenant delta). The backplane 812 inter connects the MPREs (or their LIFs) of the different host machines for the LRE 710 (for tenant epsilon). MPRE 551 and the MPRE 751 are operated by the same host machine 501, which also operates the edge 595. The MPRE 551 uses a particular rMAC ("rMAC3") to receive packets from the backplane conduit 811, and the MPRE 751 uses the same particular rMAC ("rMAC3") to receive packets from the backplane conduit 812.

Figure 11:
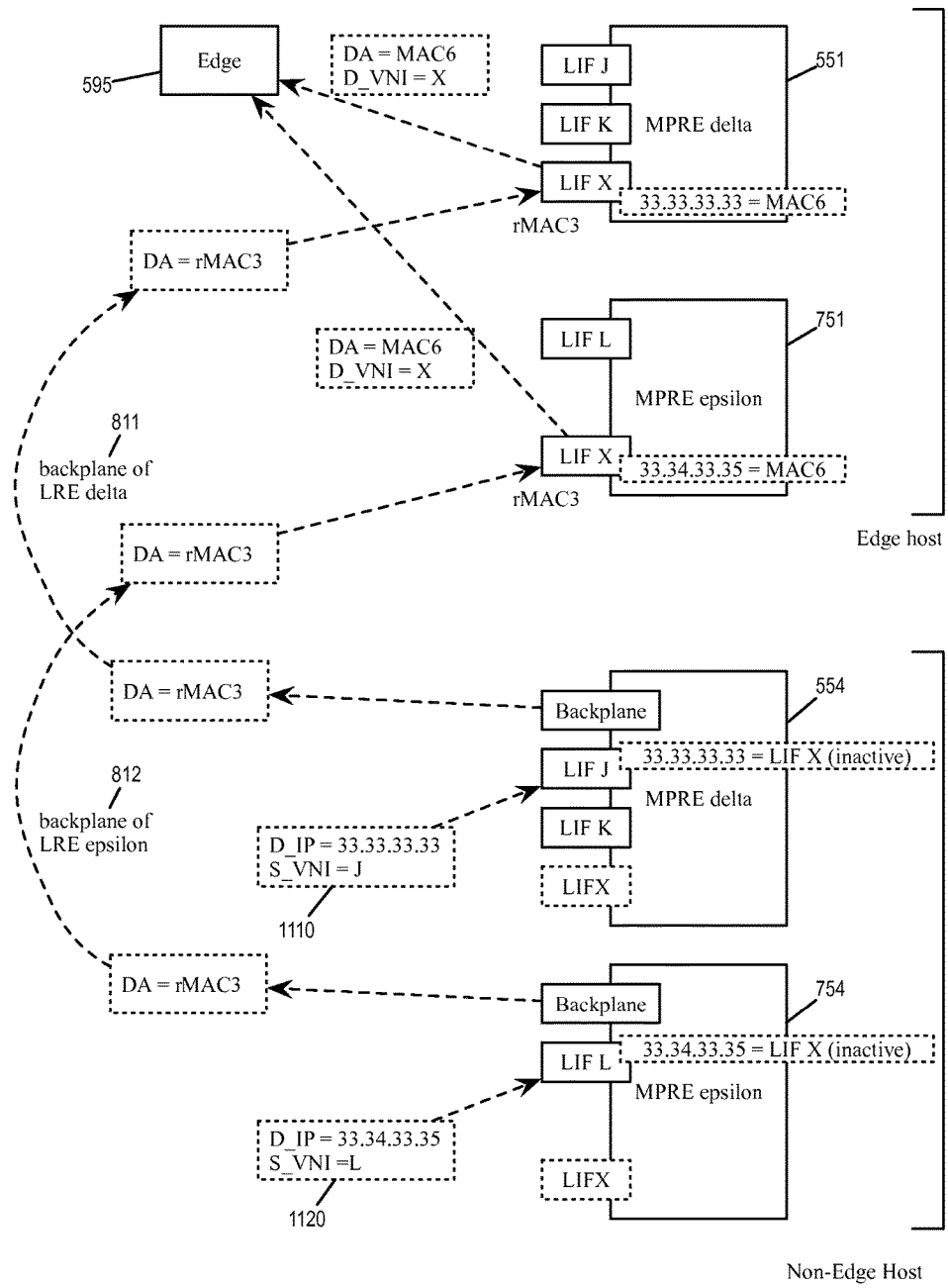
FIG. 11 illustrates how the different backplane conduits are used to segregate traffic between different tenants while using the same rMAC.

FIG. 11 illustrates how the different backplane conduits are used to segregate traffic between different tenants while using the same rMAC. Specifically, the figure shows the L3 routing of packet 1110 and 1120 through the network virtualization infrastructure 400, the packet 1110 belonging to the tenant delta while the packet 1120 belonging to the tenant epsilon. Both packets 1110 and 1120 are identified as packets to be routed by iLIF with VNI "X" (according to forwarding table), as they are both destined for the edge 595. The packet 1110 reaches its active LIF X in MPRE 551 of the edge host machine 501 through the backplane conduit 811 by using "rMAC3". The packet 1120 reaches its active LIF X in MPRE 751 of the edge host machine 501 through the backplane conduit 812 by using same "rMAC3". Thus, though both the MPRE 551 and the MPRE 751 are operated by the same edge host machine 501, and that both have active LIF with the same VNI (LIF X), the packets can still reach their respective LIF X because they are delivered by different backplane conduits.

III. ECMP Using Redirect Addresses

The rMAC as described in Section II above allows packets that need to be routed by a particular iLIF to be forwarded to a host machine where that particular iLIF is active. As described above, such rMACs serve to identify the host machine that operates the active LIF. In some embodiments, an iLIF can be active in multiple host machines. For each of such host machines, some embodiments assign a unique MAC. In other words, for a given iLIF, each of its active LIFs (or each of the host machines that operate an active LIF of the iLIF) is uniquely identifiable by such MACs. In some embodiment, such MACs are referred as lMACs (LIF MACs) as each lMAC is for identifying an active LIF. For some embodiments, either lMAC or rMAC can be used for redirecting traffic for an iLIF from a host machine on which the iLIF is dormant to a host machine on which the iLIF is active according to some embodiments described in Section II above.

As mentioned earlier by reference to FIG. 4, each LIF has a set of IP interfaces. In some embodiments, each IP interface of a LIF is associated with a host machine, which serve as a designated instance for handing traffic and ARP operations associated with the IP interface. In some embodiments, each IP interface of a LIF is assigned a unique lMAC. In other words, each host machine serving as a designated instance for an IP interface of a LIF has an assigned lMAC.

Figure 12:
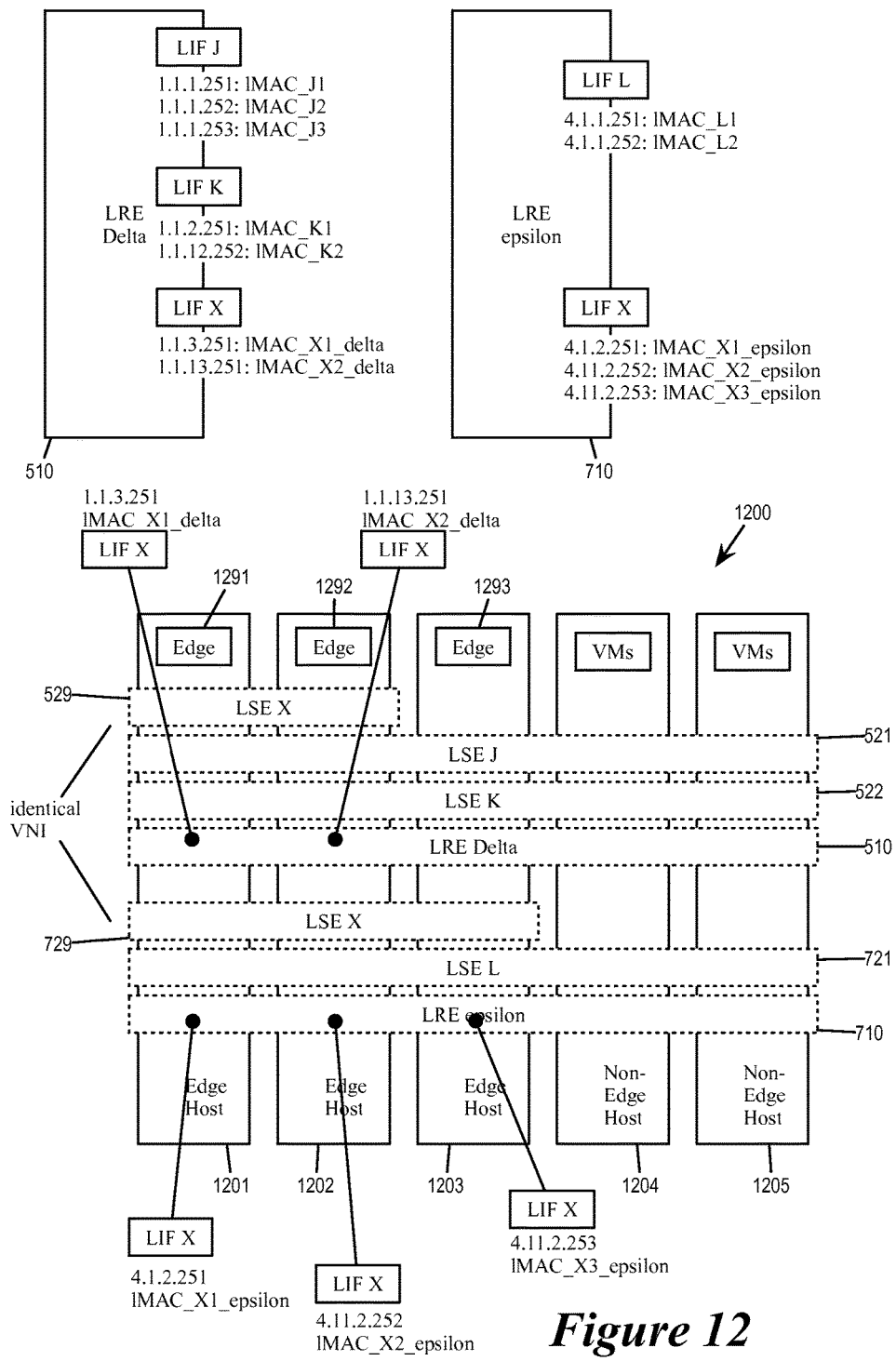
FIG. 12 illustrates the assignment of lMAC for each IP interface of each LIF.

FIG. 12 illustrates the assignment of lMAC for each IP interface of each LIF. The figure illustrates the assignment of lMACs to various IP interfaces of various LIFs for both the LRE delta (510) and the LRE epsilon (710). As illustrated, LRE delta has LIFs for L2 segments "J", "K", and "X", and LRE epsilon has LIFs for L2 segments "L" and "X". LIF J of LRE delta has three IP interfaces that are each assigned a lMAC ("lmac_j1", "lmac_j2", "lmac_j3"). LIF K of LRE delta has two IP interfaces that are each assigned a lMAC ("lmac_k1", "lmac_k2"), and LIF L of LRE epsilon also ahs two IP interfaces that are each assigned a lMAC ("lmac_L1", "lmac_L2").

Both LRE delta 510 and LRE epsilon 710 has a LIF for the L2 segment "X" for accessing the edge. The LIF X for LRE delta 510 has two IP interfaces (1.1.3.251, 1.1.13.251) and the LIF X for LRE epsilon 710 has three IP interfaces (4.1.2.251, 4.11.2.252, and 4.11.2.253). Each of the two IP interfaces of LIF X of LRE delta has an lMAC ("lmac_x1_delta", "lmac_x2_delta"), and each of the three IP interfaces of LIF X of LRE epsilon has an lMAC ("lmac_x1_epsilon", "lmac_x2_epsilon", "lmac_x3_epsilon").

FIG. 12 also illustrates the implementation of the LREs 510 and 710 at a network virtualization infrastructure 1200 that includes host machines 1201-1205. As illustrated, the LRE 510 for the tenant delta spans all host machines 1201-1205, along with LSEs 521 and 522 (for L2 segments "J" and "K"). Similarly, the LRE 710 for the tenant epsilon spans all host machines 1201-1205, along with LSE 721 (for L2 segments "L"). LIFs J, K and L are ordinary distributed LIFs that are active in all host machines spanned by their corresponding LREs.

LIF X is an iLIF for both LRE delta and LRE epsilon. It is active on only some of host machines, specifically only on host machines that host edge services. Unlike the network virtualization infrastructure 400 that has only one edge host, the network virtualization infrastructure 1200 has three edge hosts 1201-1203 hosting edges 1291-1293. These three hosts all provide edge service to an external network over the same L2 segment with VNI "X". For each LRE/tenant, each edge host is associated with one of the IP interfaces of LIF X, and the active LIF of each edge host is associated with an lMAC. Specifically, for LRE delta, the edge host 1201 provides IP interface for "1.1.3.251" and the edge host 1202 provides IP interface for "1.1.13.251". LIF X at edge host 1201 is associated with lMAC "lmac_x1_delta", and at edge host 1202 is associated with lMAC "lmac_x2_delta". For LRE epsilon, the edge host 1201 provide IP interface for "4.1.2.251", the edge host 1202 provide IP interface for "4.11.2.252", and the edge host 1203 provide IP interface for 4.11.2.253". LIF X at edge host 1201 is associated with lMAC "lmac_x1_epsilon", at edge host 1202 is associated with lMAC "lmac_x2_epsilon", and at edge host 1203 is associated with lMAC "lmac_x3_epsilon".

As mentioned, in some embodiments, a rMAC is used to identify a host machine with the active LIF for an iLIF so that packets can be forwarded to the host machine with the active LIF to complete routing. Since lMAC uniquely identifies each IP interface of each LIF, an lMAC can also be used to identify active LIFs when using iLIFs for routing. Specifically, in some embodiments, lMAC is used as the destination MAC for the backplane conduit. In addition, lMACs can be used to segregate traffic between different tenants, even traffic for the L2 segment with the same VNI. Furthermore, since different IP interfaces of a same LIF are assigned different lMACs, an lMAC can be used to select an IP interface from among several available IP interfaces for ECMP (equal cost multi-path) purposes.

Figure 13:
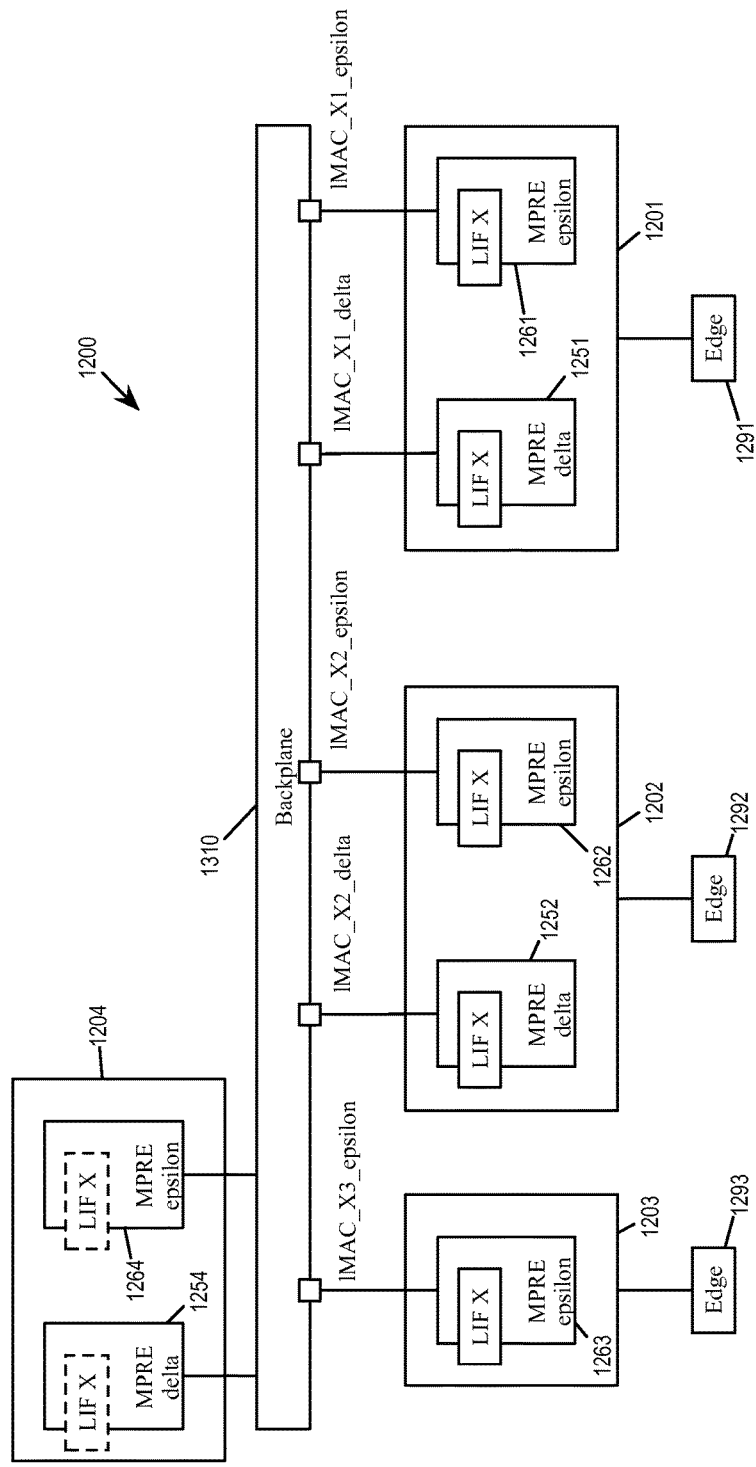
FIG. 13 illustrates using lMACs to forward packet to host machines with active LIFs.

FIG. 13 illustrates using lMACs to forward packet to host machines with active LIFs. The figure illustrates a backplane conduit 1310 that is connected to the host machines of the network virtualization infrastructure 1200. The backplane conduit 1310 allows MPREs in the network virtualization infrastructure 1200 with dormant LIF X (e.g., at host machines 1204 and 1205) to send packet to MPREs with active LIF X (e.g., at host machines 1201, 1202, and 1203.) Each IP interface of each LIF is assigned a lMAC as discussed above in FIG. 12 (i.e., "lmac_x1_delta", "lmac_x2_delta", "lmac_x1_epsilon", "lmac_x2_epsilon", and "lmac_x3_epsilon"), and the backplane conduit 1310 uses the assigned lMACs to decide which active LIF X should receive the packet.

Since each lMAC for each of the IP interfaces/active LIFs is unique, the backplane conduit 1310 is able to deliver packet to their correct destination, even though these active LIFs belong to different tenants using the same VNI. Specifically, since "lmac_x1_delta" and "lmac_x2_delta" belong to the tenant delta and "lmac_x1_epsilon", "lmac_x2_epsilon", and "lmac_x3_epsilon" belong to tenant epsilon, the backplane conduit would always be able to segregate the traffic of the two tenants.

As mentioned, in some embodiments, it is advantageous to conserve the number of MAC addresses used in the system. Some embodiments therefore assign iLIFs of different tenants to use the same lMAC addresses. For some these embodiments, each LRE/tenant has its own backplane conduit as described above by reference to FIGS. 10 and 11. When iLIF traffic of each tenant uses its own backplane conduit, different tenants may use the same lMAC addresses and still achieve traffic segregation.

As illustrated, the network virtualization infrastructure 1200 has three edges 1291-1293 to an external network. In some embodiments, this means the logical networks implemented on the environment 1200 have multiple available paths for accessing the external network. Each host machine (1204 or 1205) having inactive LIF X can perform ECMP and select one of the three active LIF X's in order to select one of three edges 1291-1293. As each of these edges is uniquely accessible by an lMAC (associated with the active LIF operating on its host machine), the ECMP is conducted to select one of the lMACs that are associated an active LIF. In some embodiments, this ECMP process selects one of the lMACs randomly. In some embodiments, the ECMP process makes its selection decision based on load balancing considerations, for example, to balance the load among the available next hops (in this case, among the three edges 1291-1293 or the three edge host machines 1201-1203).

Figure 14:
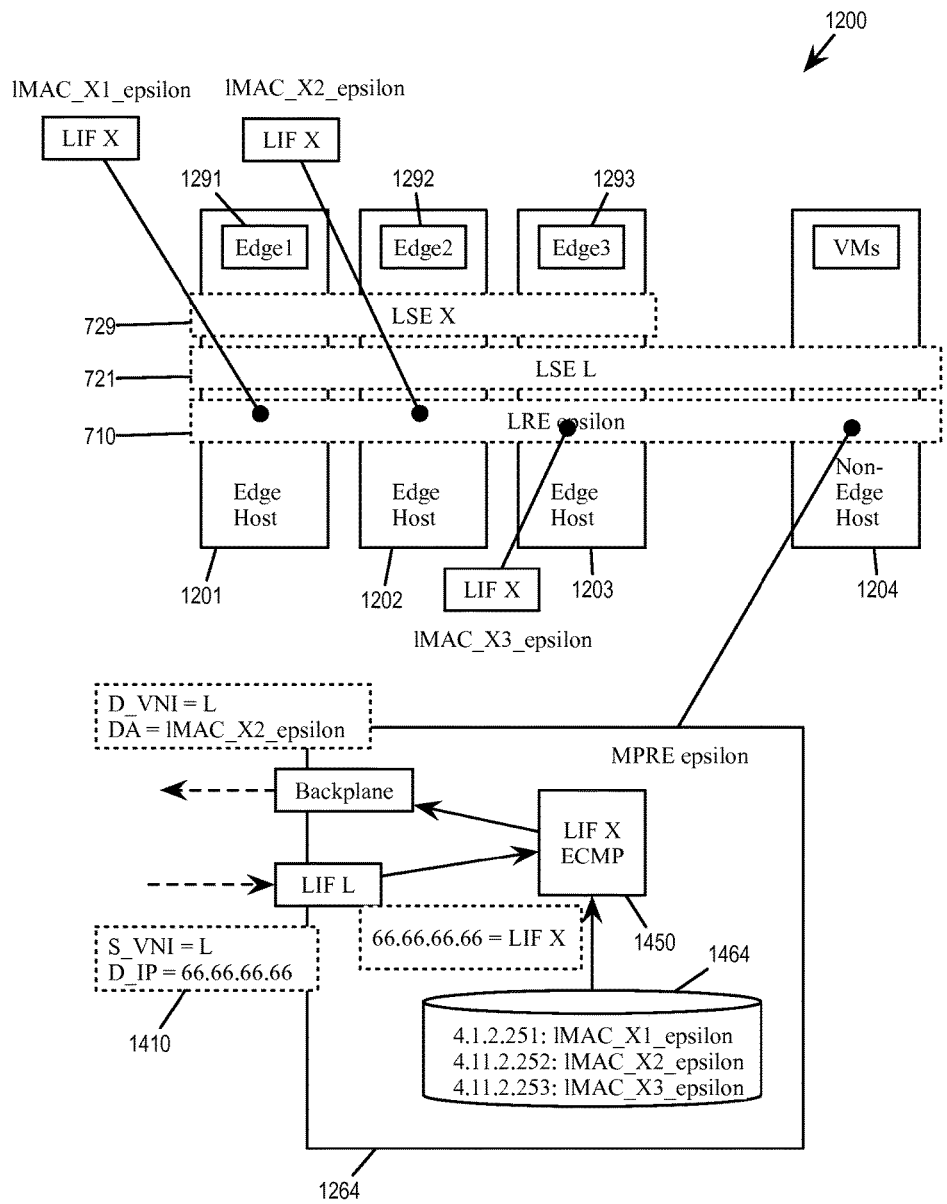
FIG. 14 illustrates ECMP based on lMACs for selecting one of the edges of the network virtualization infrastructure.

FIG. 14 illustrates ECMP based on lMACs for selecting one of the edges of the network virtualization infrastructure 1200. Specifically, the figure shows a MPRE 1264 operating on the host machine 1204 for the LRE epsilon 710 performing ECMP when sending packets to host machines with active iLIF "X". This ECMP is based on the set of lMACs that are available for the tenant epsilon when selecting one of the edges 1291-1293 as mentioned above. For illustrative simplicity, this figure illustrates only tenant epsilon.

As illustrated, the MPRE 1264 receives a packet 1410 from the MPSE (not illustrated) of the host machine 1204. The packet has a source VNI "L", so it is initially forwarded to the LIF "L" of the MPRE 1264. LIF "L" identifies the packet as requiring routing by LIF X based on the packet's destination IP address "66.66.66.66". Since LIF X is an iLIF that is inactive at the host machine 1204, the MPRE 1264 sends the packet to a host machine with an active LIF X to be routed. The MPRE 1264 is operating an ECMP module 1450 (which can be a software process running in the virtualization software) for LIF X. The LIF X ECMP has a table of available active LIFs for the LIF X that are each identified by its assigned lMAC. In some embodiments, this table of lMACs is accumulated from ARP operations performed for each of the IP interfaces of LIF X for tenant epsilon. The ECMP process selects one of the lMACs for LIF X of tenant epsilon and use that as the destination address for the packet 1410. The packet is then sent off using the backplane conduit (e.g, 1310) to reach one of the edge host machines with active LIF X based on the selected lMAC. (In the example illustrated in FIG. 14, "lMAC_X2_epsilon" is selected so the packet 1410 is sent to the host 1202).

In some embodiments, a network virtualization infrastructure can have multiple different sets of physical resources, such as multiple different VLAN segments. Each of these VLAN segment in some embodiments span only a subset of the host machine, and therefore each has a corresponding iLIF that is active only in its corresponding subset of host machines. In some embodiments, a MPRE performs ECMP for each iLIF (i.e., for each VLAN) when redirecting packets from a host machine with inactive LIF to a host machine with an active LIF.

Figure 15:
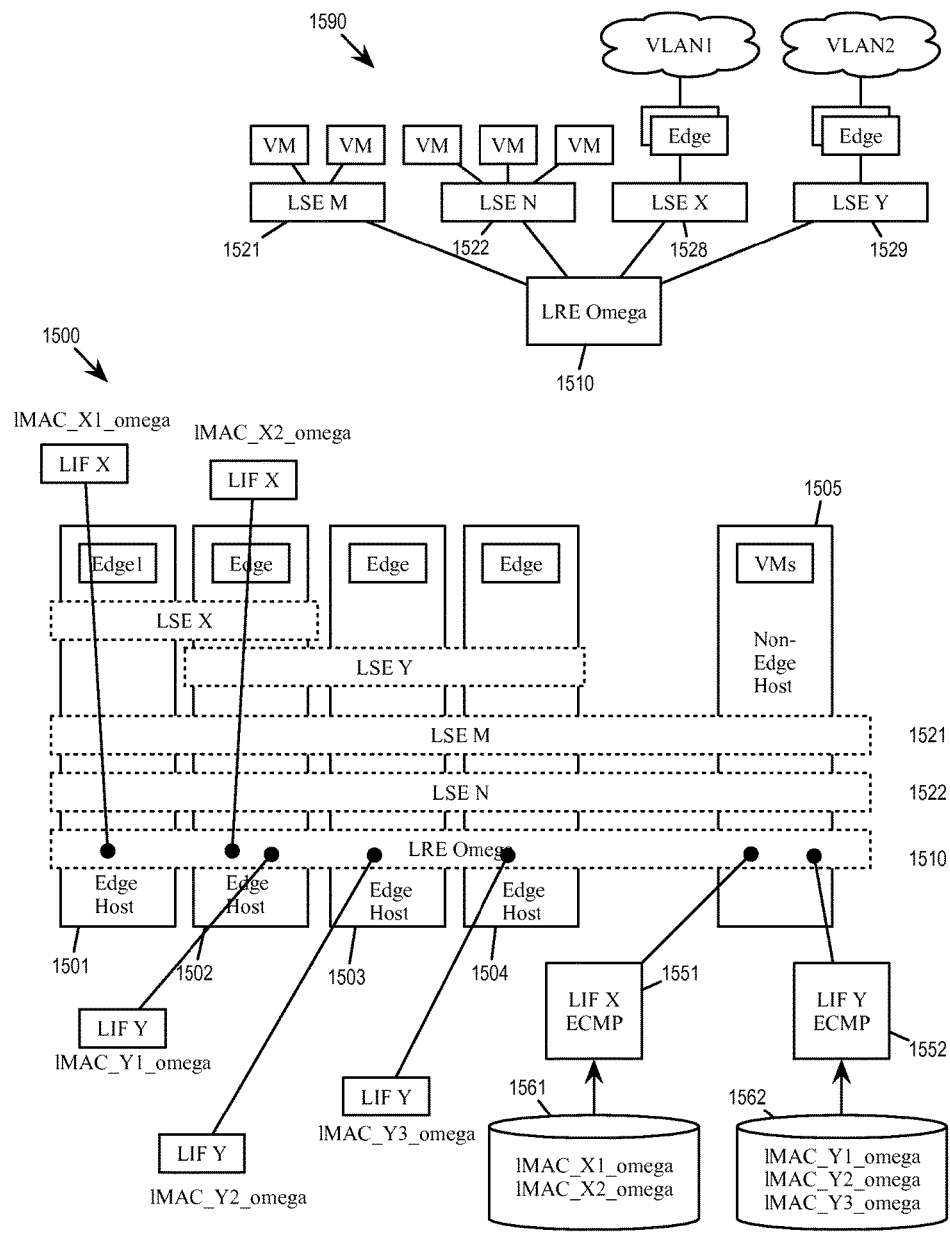
FIG. 15 illustrates a logical network that is implemented over a network virtualization infrastructure that has multiple different physical resources.

FIG. 15 illustrates a logical network 1510 that is implemented over a network virtualization infrastructure 1500 that has multiple different physical resources (e.g. access to different VLANs). Each of these physical resources has own L2 segment. These physical resources are limited to only a subset host machines, so their corresponding L2 segments interface the LRE by iLIFs that are active on only a subset of host machines.

The host machines of the network virtualization infrastructure 1500 includes host machines 1501-1505. These host machines implementing a logical network 1590 for a tenant "omega". The logical network 1590 has an LRE 1510 (LRE omega), LSEs for L2 segments "M", "N", "X", and "Y" (LSEs 1521, 1522, 1528, and 1529, respectively). The LRE 1510 spans host machines 1501-1505. LSEs for "M" and "N" are distributed and their corresponding LIFs on the LRE 1510 are active on all host machines 1501-1505. LSE "X" and LSE "Y" are VLAN physical resources that are limited to a subset of the host machines, and their LIFs are iLIFs that are active in those host machines only. Specifically, the LSE "X" spans only host machines 1501-1502, and its corresponding LIF X is only active on those two host machines. LSE "Y" spans only host machines 1502-1504, and its corresponding LIF Y is only active on those three host machines. (The host machine 1502 has physical resources for both L2 segment "X" and "Y".) Each host machine with an active LIF for the L2 segment "X" has a lMAC associated with its LIF X ("lMAC_X1 omega" and "lMAC_X2 omega" for LIF X at host machines 1501 and 1502). Each host machine with an active LIF for the L2 segment "Y" also has a lMAC associated with its LIF Y ("lMAC_Y1_omega", "lMAC_Y2_omega", and "lMAC_Y3_omega" for LIF Y at host machines 1502, 1503, and 1504).

The host machine 1505 therefore has an array of choices when redirecting packets for routing for either iLIF X or iLIF Y. As illustrated, the MPRE for the LRE 1510 at the host machine 1505 has two ECMP modules 1551 and 1552. The ECMP module 1551 has a table 1561 of available lMAC addresses for iLIF X, while the ECMP module 1552 has a table 1562 of available lMAC addresses for iLIF Y. It is worth noting that since lMAC address is assigned per IP interface per LIF, active LIFs for different L2 segments (VLANs) on a same host machine would therefore have different lMACs. In the example of FIG. 15, the host machine 1502 has active LIFs for both iLIF X and iLIF Y. However, since the active LIF for iLIF X has a different lMAC than the lMAC for the active LIF for iLIF Y ("lMAC_X2_omega" versus "lMAC_Y1_omega"), the host machine 1502 would be able to correctly direct backplane conduit traffic to the correct active LIF.

IV. System Operations

Figure 16:
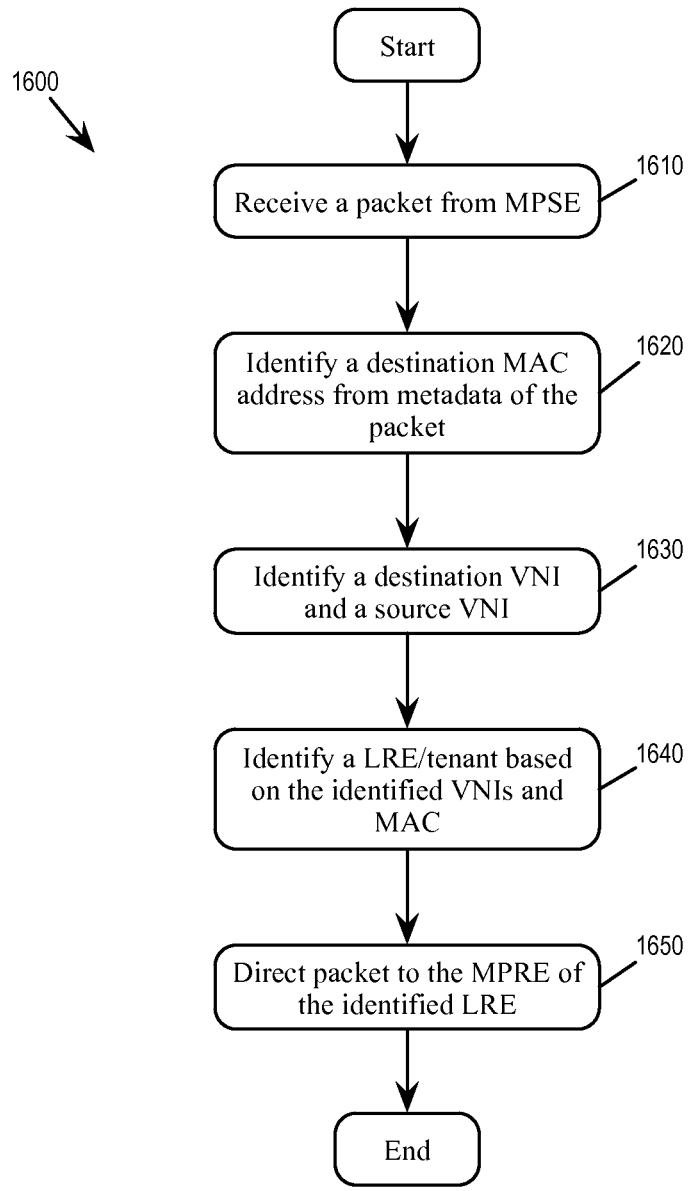
FIG. 16 conceptually illustrates a process performed by a host machine for identifying the correct MPRE for L3 routing.

As mentioned, a host machine forwards packets that need to be L3 routed from a L2 switch (MPSE) to one of the host machine's MPREs. Since virtualization software operates different MPREs for different tenants/LREs, for each incoming packet, some embodiments identify the correct MPRE (i.e., of the correct LRE/tenant) to perform the L3 routing on the packet. FIG. 16 conceptually illustrates a process 1600 performed by a host machine for identifying the correct MPRE for L3 routing. In some embodiments, this is performed a the vPort between the MPSE and the MPREs (e.g., the vPort 235).

The process starts when it receives (at 1610) a packet from the MPSE. The process then identifies (1620) the packet's destination MAC address. As mentioned, in order for the MPSE to send a packet to the MPREs for L3 routing, the packet's DA (destination MAC address field) must be vMAC. However, some embodiments preserve the original destination MAC address in a metadata tag that travels with the packet to the MPREs (i.e., the process 1600). This original MAC address can be rMAC, lMAC, or some other special purpose MAC address.

Next, the process identifies (at 1630) a destination VNI and a source VNI of the packet. In some embodiments, these information can either be found in the metadata tag of the packet or determined from the packet header itself. In some embodiments, the packets that come from the backplane conduit would have a special VNI identifying the packets as being from the backplane conduit.

The process then identifies (at 1640) the LRE or tenant based on the identified VNIs and the (original) destination MAC. For packets that come from a LRE-specific backplane conduit (as described by reference to FIG. 10 above), the process identifies the correct MPRE based on the identity of the backplane conduit. For packets that come from a backplane conduit that is shared by all tenants, the process identifies the correct MPRE by the destination MAC address, which identifies a specific LIF belonging to a specific LRE/tenant on the host machine. For packets that do not come from backplane conduit, the process identifies the LRE/tenant based on the source and destination VNIs. In some embodiments, this LRE/tenant identification operation is performed according to a hash of the VNIs and MAC addresses.

Next, the process directs (at 1650) the packet to the correct MPRE to be routed. This MPRE is the local instance of the identified LRE. The process 1600 then ends.

Figure 17:
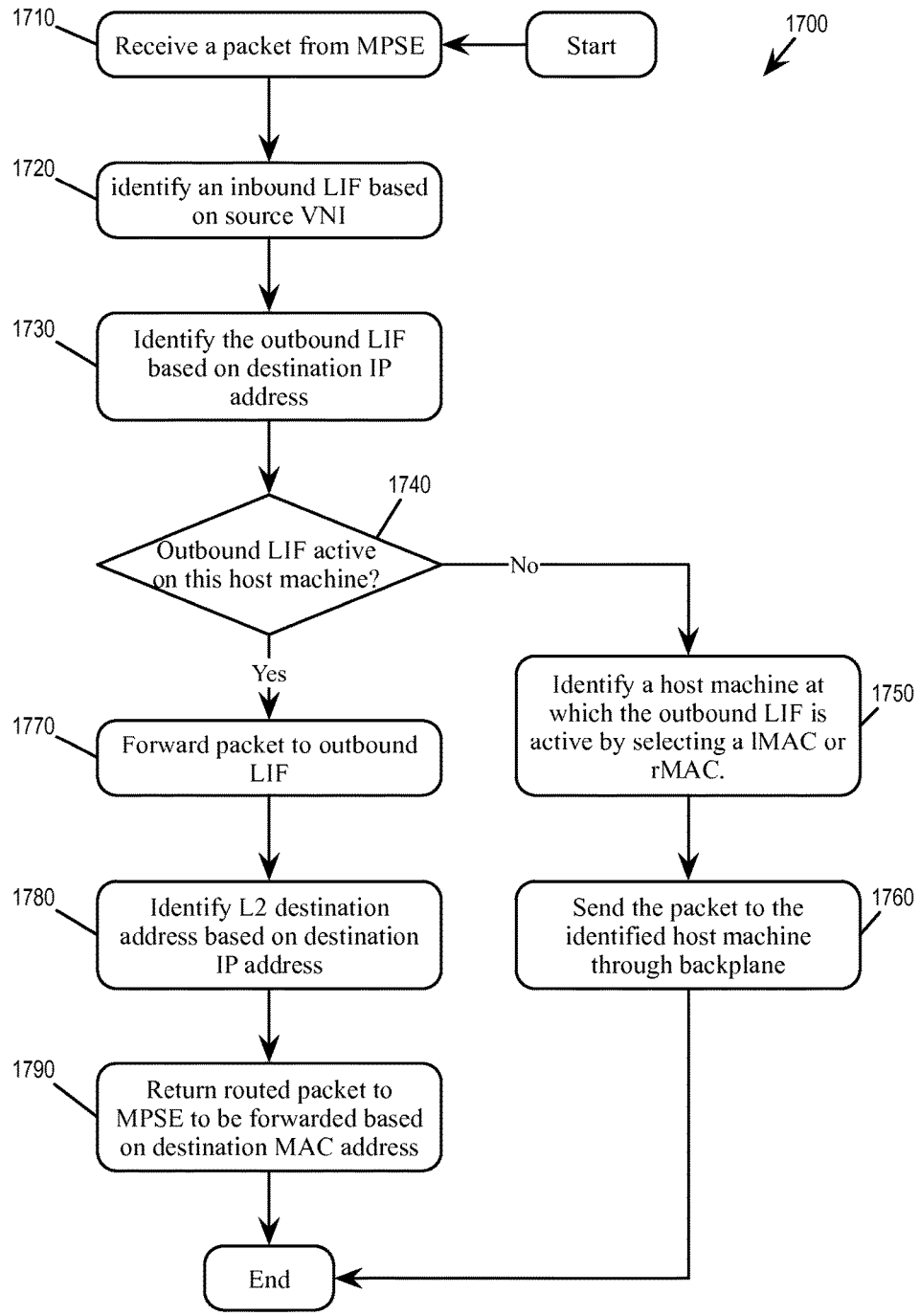
FIG. 17 conceptually illustrates a process for L3 routing by an MPRE of a host machine.

Once the packet reaches the correct MPRE (of the correct tenant/LRE), the MPRE proceeds to perform L3 routing. FIG. 17 conceptually illustrates a process 1700 for L3 routing by an MPRE of a host machine. The process starts when it receives (at 1710) a packet from the MPSE. In some embodiments, the MPRE receiving this packet is identified to be the correct MPRE according to the process 1600.

The process 1700 identifies (at 1710) an inbound LIF based on the source VNI of the packet. The process then identifies (at 1720) an outbound LIF based on the destination VNI or the destination IP address. By identifying the outbound LIF, the process determines the L2 segment that the packet is destined for after the L3 routing. In some embodiments, the process (i.e., the MPRE) identifies the outbound LIF by looking up a routing table that informs the MPRE which outbound LIF should be used to complete the L3 routing process.

Next, the process determines (at 1740) whether the identified outbound LIF is active on this host machine. If so, the process proceeds to 1770. If the identified outbound LIF is inactive at this host machine, the process proceeds to 1750 to redirect the packet to the active LIF (for the iLIF).

At 1750, the process identifies a host machine at which the identified outbound LIF is active. In some embodiments when there are multiple host machines with active LIFs, this operation involves performing an ECMP process to select one of several available lMACs or rMACs as the destination MAC address for the packet. The process then sends (at 1760) the packet with either lMAC or rMAC by using the backplane conduit of the LRE as described above. After sending the packet through backplane, the process 1700 ends.

At 1770, the process forwards the packet to the identified outbound LIF (which is active). The process then identifies (at 1780) the L2 destination address based on the destination IP address. In some embodiments, the process performs this operation at the outbound LIF by using a routing table. The process then returns (1790) the routed packet to the MPSE to be forwarded based on the destination MAC. The process 1700 then ends.

Figure 18:
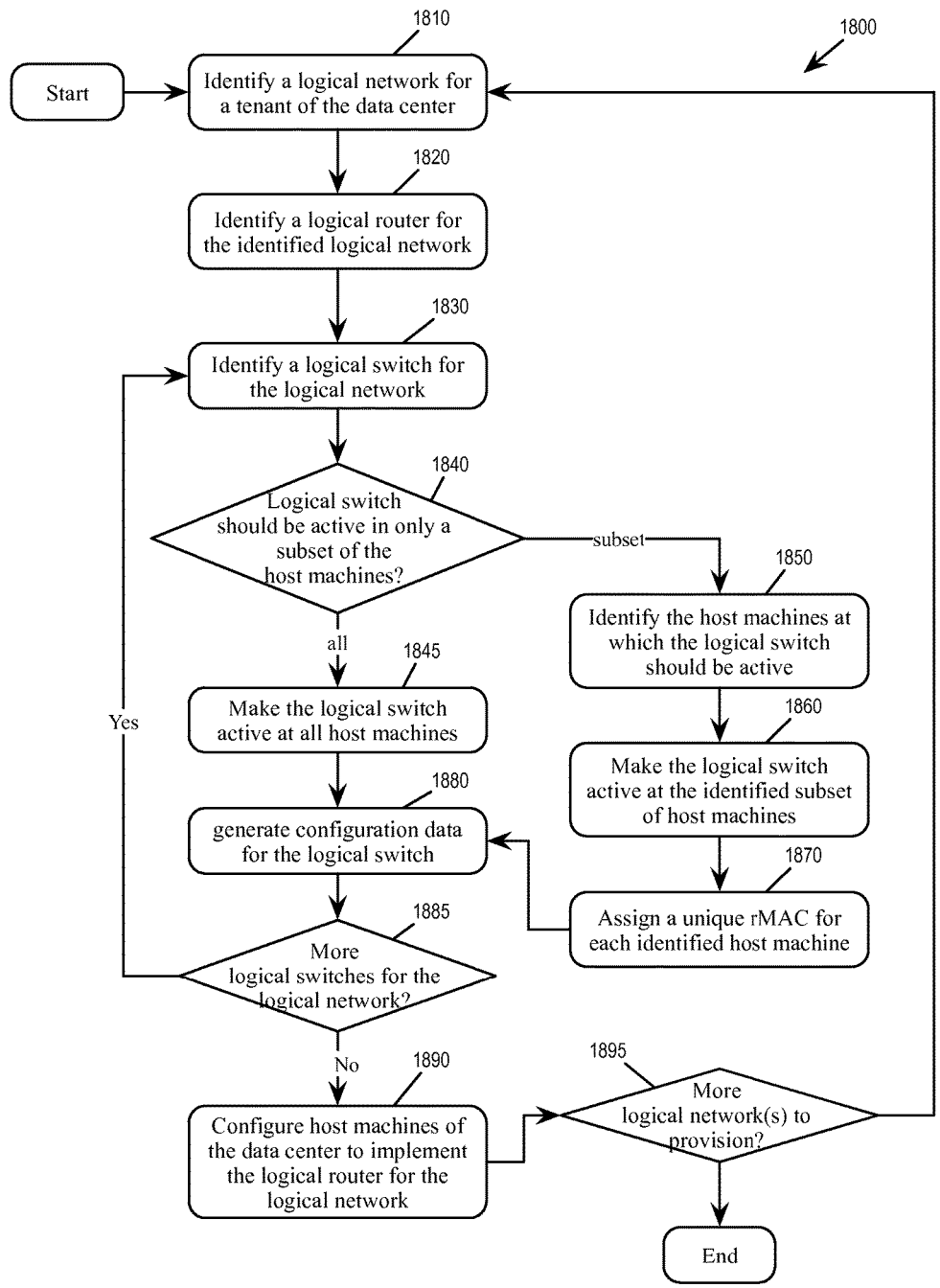
FIG. 18 conceptually illustrates a process for configuring the host machines of a datacenter to implement logical networks with iLIFs that use rMAC to redirect traffic.

In some embodiments, in order to implement a network virtualization infrastructure, a network manager of a datacenter would configure the host machines to implement the LREs and LSEs of various logical networks for various tenants. In some embodiments, the network manager also assigns rMACs to host machines at which iLIF is active. FIG. 18 conceptually illustrates a process 1800 for configuring the host machines of a datacenter to implement logical networks with iLIFs that use rMAC to redirect traffic from host machine with inactive LIF to host machine with active LIF. The process generates a set configuration data for the host machines in the virtual distributed routing environment.

The process 1800 starts when the network manager receives specifications for provisioning logical networks for tenants on the host machines of the datacenter. The process identifies (at 1810) a logical network for a tenant of the datacenter. The process then identifies (at 1820) a logical router (LRE) for the tenant or logical network.

Next, the process identifies (at 1830) a logical switch for the tenant/logical network. The process then determines (at 1840) whether the identified logical switch (i.e., L2 segment) should be active in only a subset of the host machines. As mentioned, some embodiments include L2 segments that are physical VLANs. Some physical VLANs do not need to span all host machines of the logical network, since these physical VLANs are physically confined to certain dedicated host machines such as edge hosts. If the identified L2 segment should be active in all host machines, the process proceeds to 1845. If the identified L2 segment should be limited to only a subset of the host machines, the process proceeds to 1850.

At 1845, the process makes the corresponding LIF of the L2 segment active in all host machines (i.e., as a dLIF). The process then proceeds to 1880.

At 1850, the process identifies host machines at which the logical switch should be active (e.g., to identify the host machines in the edge rack). The process then makes (at 1860) the logical switch active in those identified subset of host machines while leaving others inactive. In some embodiments, the LRE (and its LIFs and LSEs) are provisioned by one uniform set of configuration data that is provided to all host machines implementing the logical network. In some of these embodiments, for each LIF of the LRE, the configuration data identifies the host machines for which the LIF is to be active (or inactive).

The process also assigns (at 1870) a unique rMAC for each identified hos machine. In some embodiments, such rMAC assignment is embedded in the configuration data that is provided to all host machines. In some embodiments, the process configures each identified host machine with the assigned rMAC. The process then proceeds to 1880.

At 1880, the process generates configuration data for the logical switch that will be used to configure the host machines in subsequent operations. The process then determines (at 1885) whether there is another logical switch for the identified tenant. If so, the process returns to 1830 to provision another logical switch. If there is no other logical switch that is yet to be provisioned, the process proceeds to 1890.

At 1890, the process configures the host machines of datacenter to implement the logical router/logical network for the tenant. In some embodiments, the configuration data for logical switches and their corresponding LIFs is also delivered to the host machines as part of the configuration data for the logical router. The process then determines (at 1895) if there is another logical network for a tenant to be provisioned. If so, the process returns to 1810 to provision the other tenant. Otherwise, the process 1800 ends.

Figure 19:
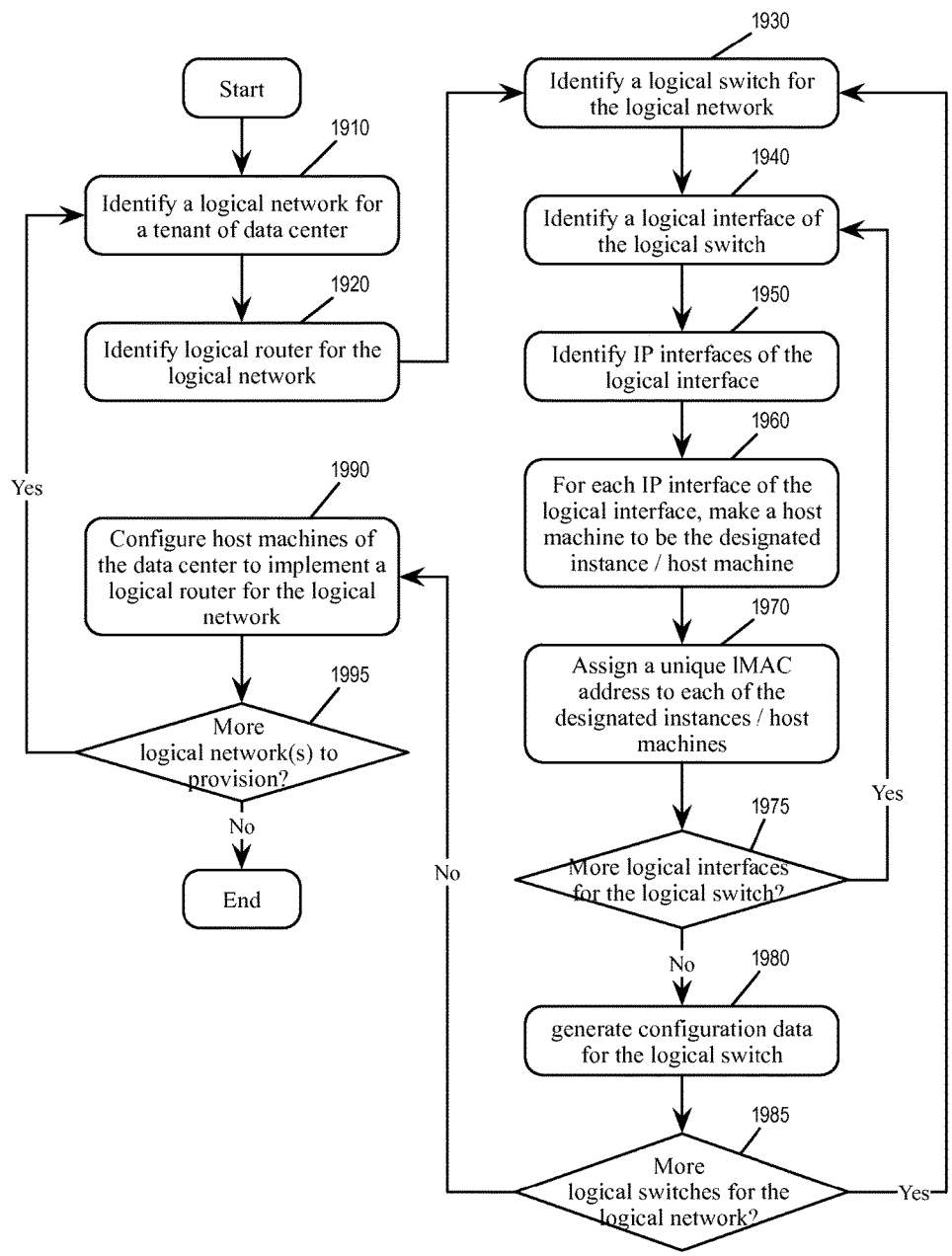
FIG. 19 conceptually illustrates a process for configuring host machines of a datacenter and assigning an lMAC to each IP interface of each LIF.

In addition to or instead of assigning rMACs to host machines where iLIFs are active, a network manager in some embodiments assigns lMACs to IP interfaces of LIFs. FIG. 19 conceptually illustrates a process 1900 for configuring host machines of a datacenter and assigning an lMAC to each IP interface of each LIF. The process starts when the network manager receives specifications for provisioning logical networks on the host machines of the datacenter. The process then identifies (at 1910) a logical network for a tenant of the datacenter. The process then identifies (at 1920) a logical router (LRE) for the logical network.

Next, the process identifies (at 1930) a logical switch or L2 segment for the tenant/logical network.

The process then identifies (at 1940) a logical interface (LIF) of the logical switch. In some embodiments, only iLIFs are assigned lMACs, and so the process 1900 identifies only iLIFs, i.e., only L2 segments that are active in some host machine but not others. In some embodiments, all LIFs are assigned lMACs, so the process would identify all LIFs regardless of its type.

The process then identifies (at 1950) the IP interfaces of the identified LIF. For each identified interface of the LIF, the process selects a host machine to be the designated instance for handling the traffic (such as ARP request) targeting the IP interface. The process then assigns (at 1970) a unique lMAC address to each IP interface's of the LIF (i.e., assigning an lMAC address to each designated instance host machine for the IP interface). In some embodiments, the process assigns lMAC addresses that are not used by other tenants/logical networks. In some embodiments, the process reuse/recycle lMAC addresses that are already in use by other tenants/logical networks in order to avoid MAC address proliferation.

The process then determines (at 1975) if there is another LIF for the logical switch for which lMACs have not been assigned. In some embodiments, only iLIFs are assigned lMACs, so the process only identifies iLIFs. If there is another LIF that should be assigned lMAC but has yet to be, the process returns to 1940. Otherwise, the process proceeds to 1980.

At 1980, the process generates configuration data for the logical switch that will be used to configure the host machines in subsequent operations. The process then determines (at 1985) whether there is another logical switch for the identified tenant. If so, the process returns to 1830 to provision another logical switch. If there is no other logical switch that is yet to be provisioned, the process proceeds to 1990.

At 1990, the process configures the host machines of the datacenter to implement the logical router/logical network for the tenant. In some embodiments, the configuration data for logical switches and their corresponding LIFs is also delivered to the host machines as part of the configuration data for the logical router. The process then determines (at 1995) if there is another tenant/logical network to be provisioned. If so, the process returns to 1910 to provision the other logical network. Otherwise, the process 1900 ends.

V. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 20:
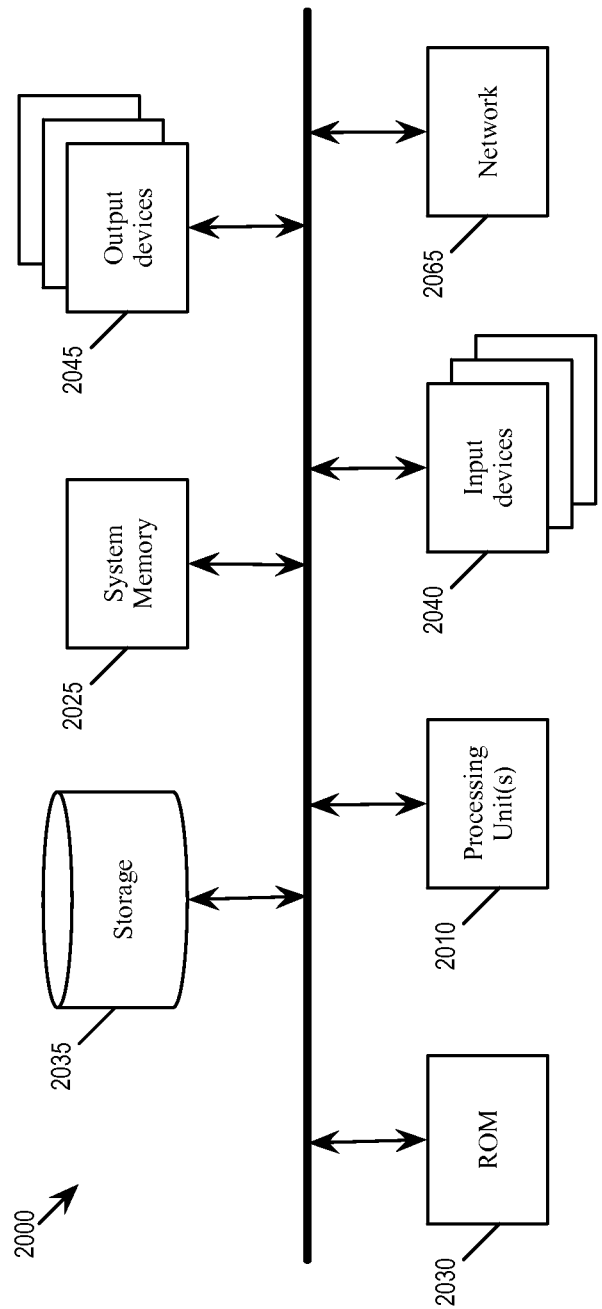
FIG. 20 conceptually illustrates an electronic system with which some embodiments of the invention are implemented.

FIG. 20 conceptually illustrates an electronic system 2000 with which some embodiments of the invention are implemented. The electronic system 2000 can be used to execute any of the control, virtualization, or operating system applications described above. The electronic system 2000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2000 includes a bus 2005, processing unit(s) 2010, a system memory 2025, a read-only memory 2030, a permanent storage device 2035, input devices 2040, and output devices 2045.

The bus 2005 collectively represents all system, peripheral, and chipset buses that communicatively connect the numerous internal devices of the electronic system 2000. For instance, the bus 2005 communicatively connects the processing unit(s) 2010 with the read-only memory 2030, the system memory 2025, and the permanent storage device 2035.

From these various memory units, the processing unit(s) 2010 retrieves instructions to execute and data to process in order to execute the processes of the invention. The processing unit(s) may be a single processor or a multi-core processor in different embodiments.

The read-only-memory (ROM) 2030 stores static data and instructions that are needed by the processing unit(s) 2010 and other modules of the electronic system. The permanent storage device 2035, on the other hand, is a read-and-write memory device. This device is a non-volatile memory unit that stores instructions and data even when the electronic system 2000 is off. Some embodiments of the invention use a mass-storage device (such as a magnetic or optical disk and its corresponding disk drive) as the permanent storage device 2035.

Other embodiments use a removable storage device (such as a floppy disk, flash drive, etc.) as the permanent storage device. Like the permanent storage device 2035, the system memory 2025 is a read-and-write memory device. However, unlike storage device 2035, the system memory is a volatile read-and-write memory, such a random access memory. The system memory stores some of the instructions and data that the processor needs at runtime. In some embodiments, the invention's processes are stored in the system memory 2025, the permanent storage device 2035, and/or the read-only memory 2030. From these various memory units, the processing unit(s) 2010 retrieves instructions to execute and data to process in order to execute the processes of some embodiments.

The bus 2005 also connects to the input and output devices 2040 and 2045. The input devices enable the user to communicate information and select commands to the electronic system. The input devices 2040 include alphanumeric keyboards and pointing devices (also called "cursor control devices"). The output devices 2045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 20, bus 2005 also couples electronic system 2000 to a network 2065 through a network adapter (not shown). In this manner, the computer can be a part of a network of computers (such as a local area network ("LAN"), a wide area network ("WAN"), or an Intranet, or a network of networks, such as the Internet. Any or all components of electronic system 2000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

In this document, the term "packet" refers to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 16, 17, 18, and 19) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A system comprising:
a plurality of host machines that are configured to operate a first LRE (logical routing element) for routing packets between a first set of network segments in a first logical network and a second LRE for routing packets between a second set of network segments in a second logical network, wherein each host machine executes a first MPRE (managed physical routing element) as a local instance of the first LRE and a second MPRE as a local instance of the second LRE,
wherein at least one particular network segment connects the first and second LREs with at least one edge gateway that executes on a particular host machine and serves as a gateway node at an edge boundary of each logical network and an external network,
wherein the first LRE comprises a first backplane conduit and the second LRE comprises a second backplane conduit,
wherein for the edge gateway to process packets, the particular host machine receives packets addressed to a shared network address (1) from the first logical network through the first backplane conduit at the particular host machine's first MPRE and (2) from the second logical network through the second backplane conduit at the particular host machine's second MPRE.

2. The system of claim 1, wherein each host machine operates a MPSE (managed physical switching element) for handling L2 switching for both the first logical network and the second logical network, wherein the MPSE performs switching of a packet between a plurality of ports based on a MAC address and a network segment identifier.

3. The system of claim 2, wherein the first MPRE and the second MPRE share a same port at the MPSE on the particular host machine, wherein the particular host machine determines which MPRE receives a particular packet based on at least one of (1) a network segment identifier associated with the packet and (2) an identity of the backplane conduit used to transport the packet.

4. The system of claim 3, wherein the particular packet is destined for the particular network segment having a particular network segment identifier, wherein the first MPRE on the particular host machine receives the particular packet when the identity of the backplane conduit belongs to the first backplane conduit, wherein the second MPRE on the particular host machine receives the particular packet when the identity of the backplane conduit belongs to the second backplane conduit.

5. The system of claim 2, wherein the network identifier is a VNI (virtual network identifier) of a VLAN network that is accessible by both the first logical network and the second logical network.

6. The system of claim 1, wherein the particular network segment is an IP subnet that is accessible by both the first logical network and the second logical network.

7. The system of claim 1, wherein the first MPRE of the particular host machine receives a first packet from the first backplane conduit based on a MAC address associated with the particular host machine, wherein the second MPRE of the particular host machine receives a second packet from the second backplane conduit based on the same MAC address.

8. The system of claim 1, wherein the edge gateway is an edge service gateway that provides edge services at the edge boundary between each logical network and the external network.

9. A non-transitory machine readable medium storing a program for operating a logical network over a plurality of host machines, the program comprising sets of instructions for:
at a particular host machine of the plurality of host machines, operating a first MPRE (managed physical routing element) and a second MPRE, wherein the first MPRE is a local instance of a first LRE (logical routing element) for routing packets between a first set of segments of a first logical network and the second MPRE is a local instance of a second LRE for routing packets between a second set of segments of a second logical network,
wherein at least one particular network segment connects the first and second LREs with at least one edge gateway that executes on the particular host machine and serves as a gateway node at an edge boundary of each logical network and an external network,
wherein the first LRE comprises a first backplane conduit and the second LRE comprises a second backplane conduit; and
for the edge gateway to process packets, receiving, at the particular host machine, packets addressed to a shared network address (1) from the first logical network through the first backplane conduit at the first MPRE and (2) from the second logical network through the second backplane conduit at the second MPRE.

10. The non-transitory machine readable medium of claim 9, wherein the particular host machine operates a MPSE (managed physical switching element) for handling L2 switching for both the first logical network and the second logical network, wherein the MPSE performs switching of a packet between a plurality of ports based on a MAC address and a network segment identifier.

11. The non-transitory machine readable medium of claim 10, wherein the first MPRE and the second MPRE share a same port at the MPSE, wherein the particular host machine determines which MPRE receives a particular packet based on at least one of (1) a network segment identifier associated with the packet and (2) an identity of the backplane conduit used to transport the packet.

12. The non-transitory machine readable medium of claim 11, wherein the particular packet is destined for the particular network segment having a particular network segment identifier, wherein the first MPRE receives the particular packet when the identity of the backplane conduit belongs to the first backplane conduit, wherein the second MPRE receives the particular packet when the identity of the backplane conduit belongs to the second backplane conduit.

13. The non-transitory machine readable medium of claim 9, wherein the particular network segment is an IP subnet that is accessible by both the first logical network and the second logical network.

14. The non-transitory machine readable medium of claim 9, wherein the network identifier is a VNI (virtual network identifier) of a VLAN network that is accessible by both the first logical network and the second logical network.

15. The non-transitory machine readable medium of claim 9, wherein the first MPRE of the particular host machine receives a first packet from the first backplane conduit based on a MAC address associated with the particular host machine, wherein the second MPRE of the particular host machine receives a second packet from the second backplane conduit based on the same MAC address.

16. The non-transitory machine readable medium of claim 9, wherein the edge gateway is an edge service gateway that provides edge services at the edge boundary between each logical network and the external network.

17. A method of operating a plurality of logical networks over a network virtualization infrastructure that comprises a plurality of host machines operating a set of virtual machines (VMs), the method comprising:

defining a first LRE (logical routing element) for routing packets between a first set of network segments in a first logical network and a second LRE for routing packets between a second set of network segments in a second logical network, wherein each host machine executes a first MPRE (managed physical routing element) as a local instance of the first LRE and a second MPRE as a local instance of the second LRE, wherein at least one particular network segment connects the first and second LREs with at least one edge gateway that executes on a particular host machine and serves as a gateway node at an edge boundary of each logical network and an external network;

defining a first backplane conduit for the first LRE and a second backplane conduit for the second LRE, wherein for the edge gateway to process packets, the particular host machine receives packets addressed to a shared network address (1) from the first logical network through the first backplane conduit at the particular host machine's first MPRE and (2) from the second logical network through the second backplane conduit at the particular host machine's second MPRE; and generating configuration data based on the defined LREs and the defined backplane conduits and configuring the plurality of host machines by using the generated configuration data.

18. The method of claim 17, wherein each host machine operates a MPSE (managed physical switching element) for handling L2 switching for both the first logical network and the second logical network, wherein the MPSE performs switching of a packet between a plurality of ports based on a MAC address and a network segment identifier.

19. The method of claim 18, wherein the first MPRE and the second MPRE share a same port at the MPSE on the particular host machine, wherein the particular host machine determines which MPRE receives a particular packet based on at least one of (1) a network segment identifier associated with the packet and (2) an identity of the backplane conduit used to transport the packet.

20. The method of claim 19, wherein the particular packet is destined for the particular network segment having a particular network segment identifier, wherein the first MPRE on the particular host machine receives the particular packet when the identity of the backplane conduit belongs to the first backplane conduit, wherein the second MPRE on the particular host machine receives the particular packet when the identity of the backplane conduit belongs to the second backplane conduit.

21. The method of claim 17, wherein the particular network segment is an IP subnet that is accessible by both the first logical network and the second logical network.

22. The method of claim 18, wherein the network identifier is a VNI (virtual network identifier) of a VLAN network that is accessible by both the first logical network and the second logical network.

23. The method of claim 17, wherein the first MPRE of the particular host machine receives a first packet from the first backplane conduit based on a MAC address associated with the particular host machine, wherein the second MPRE of the particular host machine receives a second packet from the second backplane conduit based on the same MAC address.

24. The method of claim 17, wherein the edge gateway is an edge service gateway that provides edge services at the edge boundary between each logical network and the external network.

* * * * *